(12) United States Patent
Peng

(10) Patent No.: US 11,128,802 B2
(45) Date of Patent: Sep. 21, 2021

(54) PHOTOGRAPHING METHOD AND MOBILE TERMINAL

(71) Applicant: VIVO MOBILE COMMUNICATION CO., LTD., Chang'an Dongguan (CN)

(72) Inventor: Guilin Peng, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 16/633,777

(22) PCT Filed: Jul. 25, 2018

(86) PCT No.: PCT/CN2018/097031
§ 371 (c)(1),
(2) Date: Jan. 24, 2020

(87) PCT Pub. No.: WO2019/020052
PCT Pub. Date: Jan. 31, 2019

(65) Prior Publication Data
US 2020/0204738 A1 Jun. 25, 2020

(30) Foreign Application Priority Data
Jul. 26, 2017 (CN) .......................... 201710620390.6

(51) Int. Cl.
*H04N 5/232* (2006.01)
*G06F 3/01* (2006.01)

(52) U.S. Cl.
CPC ....... *H04N 5/232935* (2018.08); *G06F 3/017* (2013.01); *H04N 5/23216* (2013.01); *H04N 5/23218* (2018.08); *H04N 5/232939* (2018.08)

(58) Field of Classification Search
CPC ......... H04N 5/232935; H04N 5/23216; H04N 5/232939; H04N 5/23218; H04N 5/232; G06F 3/017
(Continued)

(56) References Cited

U.S. PATENT DOCUMENTS 8,400,547 B2 * 3/2013 Akita ............... H04N 5/232411
348/333.01
9,088,721 B2 * 7/2015 Akita ..................... G03B 19/02
(Continued)

FOREIGN PATENT DOCUMENTS

CN 101465960 A 6/2009
CN 102055906 A 5/2011
(Continued)

OTHER PUBLICATIONS

Chinese First Office Action Application No. 201710620390.6; dated Jul. 6, 2018.
(Continued)

*Primary Examiner* — Pritham D Prabhakher
(74) *Attorney, Agent, or Firm* — von Briesen & Roper, s.c.

(57) ABSTRACT

A photographing method and a mobile terminal are provided, which are related to communication technologies. The photographing method includes: receiving a photographing function start instruction; displaying, on the first display screen and the second display screen respectively in a full screen display manner, a preview image acquired by the rear camera; displaying, on the second display screen, pre-stored composition reference information; determining target composition information in the composition reference information; and controlling the rear camera to perform a photographing operation, based on the target composition information.

18 Claims, 11 Drawing Sheets

(58) Field of Classification Search
USPC .................................................. 348/333.02
See application file for complete search history.

(56) References Cited

U.S. PATENT DOCUMENTS

| | | | |
|---|---|---|---|
| 9,462,169 B2* | 10/2016 | Xie | H04N 5/2256 |
| 10,154,186 B2* | 12/2018 | Kang | H04N 5/2258 |
| 10,606,398 B2* | 3/2020 | Kim | G06F 3/04883 |
| 2004/0008266 A1 | 1/2004 | Kitada et al. | |
| 2004/0036779 A1 | 2/2004 | Cazier et al. | |
| 2009/0073285 A1 | 3/2009 | Terashima | |
| 2009/0162043 A1 | 6/2009 | Chou | |
| 2010/0110215 A1* | 5/2010 | Akita | H04N 5/23219 348/222.1 |
| 2011/0032377 A1* | 2/2011 | Kim | H04N 5/232945 348/222.1 |
| 2011/0074971 A1 | 3/2011 | Kwon | |
| 2011/0102621 A1 | 5/2011 | Kim | |
| 2011/0134269 A1* | 6/2011 | Kim | H04N 5/23219 348/222.1 |
| 2011/0317031 A1 | 12/2011 | Honda | |
| 2014/0368716 A1 | 12/2014 | Maruyama | |
| 2015/0015762 A1* | 1/2015 | Kim | H04N 5/23245 348/333.05 |
| 2015/0049234 A1* | 2/2015 | Jung | H04N 5/23218 348/333.05 |
| 2015/0109507 A1* | 4/2015 | Li | H04N 5/247 348/333.01 |
| 2015/0125128 A1 | 5/2015 | Akita et al. | |
| 2015/0189138 A1* | 7/2015 | Xie | H04N 5/232935 348/222.1 |
| 2015/0229849 A1* | 8/2015 | Shin | G06F 3/017 348/207.1 |
| 2016/0005945 A1 | 1/2016 | Furuhashi | |
| 2016/0119552 A1* | 4/2016 | Oh | H04N 5/232935 348/333.06 |
| 2017/0180626 A1* | 6/2017 | Hayashi | H04N 21/41407 |
| 2017/0180632 A1* | 6/2017 | Yang | H04N 5/232935 |
| 2017/0180648 A1* | 6/2017 | Yang | H04N 5/23222 |
| 2017/0237898 A1* | 8/2017 | Lee | H04N 5/23293 348/222.1 |
| 2017/0285764 A1* | 10/2017 | Kim | G03B 17/02 |
| 2017/0289444 A1* | 10/2017 | Han | H04N 5/23219 |
| 2017/0339347 A1* | 11/2017 | Cho | H04N 5/2621 |
| 2018/0176458 A1* | 6/2018 | Tsuchiya | H04N 5/23222 |
| 2018/0365856 A1* | 12/2018 | Parasnis | G06T 7/80 |
| 2019/0038260 A1* | 2/2019 | Lee | A61B 8/54 |
| 2019/0199926 A1* | 6/2019 | An | H04N 5/23245 |

FOREIGN PATENT DOCUMENTS

| | | |
|---|---|---|
| CN | 102420942 A | 4/2012 |
| CN | 103297697 A | 9/2013 |
| CN | 103780822 A | 5/2014 |
| CN | 104094588 A | 10/2014 |
| CN | 104301613 A | 1/2015 |
| CN | 104539843 A | 4/2015 |
| CN | 104539844 A | 4/2015 |
| CN | 104580891 A | 4/2015 |
| CN | 105578037 A | 5/2016 |
| CN | 105959544 A | 9/2016 |
| CN | 105991925 A | 10/2016 |
| CN | 106453962 A | 2/2017 |
| CN | 106534651 A | 3/2017 |
| CN | 107257439 A | 10/2017 |
| EP | 2830306 A2 | 1/2015 |
| JP | 2005080020 A | 3/2005 |
| JP | 2005151375 A | 6/2005 |
| KR | 100832936 B1 | 5/2008 |

OTHER PUBLICATIONS

European Search Repprt Application No. 18839353.2; dated Apr. 8, 2020.

International Search Report & Written Opinion related to Application No. PCT/CN2018/097031; dated Nov. 13, 2018.

* cited by examiner (d)        (b)

(d)        (c)

PHOTOGRAPHING METHOD AND MOBILE TERMINAL

CROSS-REFERENCE TO RELATED APPLICATION

This application is the U.S. national phase of PCT Application PCT/CN2018/097031 filed on Jul. 25, 2018, which claims a priority to Chinese Patent Application No. 201710620390.6 filed in China on Jul. 26, 2017, the disclosure of which is incorporated herein in its entirety by reference.

TECHNICAL FIELD

The present disclosure relates to the field of communication technologies, and in particular, to a photographing method and a mobile terminal.

BACKGROUND

With the rapid development and wide application of mobile terminals, more and more users will use the mobile terminal to take pictures to record their lives and so on, and at the same time, they are increasingly demanding on the beauty of photos. In order to take a more beautiful photo, choosing a better composition method when taking a photo will be helpful in improving the aesthetics of the photo to a certain extent.

In the related art, the composition in the photographing process is generally made by the photographer by referring to some of the composition methods or photographing actions memorized before taking the picture, so as to use it during the photographing process; or by using the basic nine-block-box lattice composition in some photographing applications (APP) for composition. However, in the photographing method in the related art, the composition can only be determined by the photographer. The photographed person cannot see the composition mode or the photographing effect in real time, which may make the photos not be satisfied by the photographed person.

SUMMARY

A photographing method is provided in the embodiments of the present disclosure, to solve the technical issue in the related art where the composition may only be determined by the photographer while the photographed person may be unsatisfied with the photographed photo.

In a first aspect, a photographing method is provided in the present disclosure, applied to a mobile terminal, where the mobile terminal includes a rear camera, a first display screen and a second display screen oppositely arranged, and the rear camera and the second display screen are arranged at the same side, and the method includes:
receiving a photographing function start instruction;
displaying, on the first display screen and the second display screen respectively in a full screen display manner, a preview image acquired by the rear camera;
displaying, on the second display screen, pre-stored composition reference information;
determining target composition information in the composition reference information; and
controlling the rear camera to perform a photographing operation, based on the target composition information.

In a second aspect, a mobile terminal is provided in the present disclosure, including: a rear camera, a first display screen and a second display screen oppositely arranged, where the rear camera and the second display screen are arranged at the same side, and the mobile terminal further includes:
an instruction receiving module, configured to receive a photographing function start instruction;
a first preview image showing module, configured to display, on the first display screen and the second display screen respectively in a full screen display manner, a preview image acquired by the rear camera;
a first composition reference information displaying module, configured to display, on the second display screen, pre-stored composition reference information;
a target composition information determining module, configured to determine target composition information in the composition reference information; and
a photographing module, configured to control the rear camera to perform a photographing operation, based on the target composition information.

In a third aspect, a mobile terminal is provided in the present disclosure, including: a memory, a processor and a computer program stored in the memory and executable by the processor, where the computer program is executed by the processor to perform the photographing method hereinabove.

In a fourth aspect, a computer-readable storage medium is provided in the embodiments of the present disclosure, where a computer program is stored in the computer-readable storage medium, and the computer program is executed by a processor to perform the photographing method hereinabove.

BRIEF DESCRIPTION OF THE DRAWINGS

In order to describe the technical solutions of the embodiments of the present disclosure more clearly, the drawings used in the description of the embodiments of the present disclosure are briefly described below. Obviously, the drawings in the following description are merely some embodiments of the present disclosure. For those of ordinary skill in the art, other drawings may be obtained based on these drawings without creative work.

DETAILED DESCRIPTION

The technical solutions in the embodiments of the present disclosure will be described hereinafter clearly and completely with reference to the drawings of the embodiments of the present disclosure. Obviously, the embodiments described hereinafter are a part of the embodiments of the present disclosure, not all of embodiments of the present disclosure. Based on the embodiments of the present disclosure, all other embodiments acquired by those ordinary skilled in the art without creative work will fall into the scope of the present disclosure.

Figure 1:
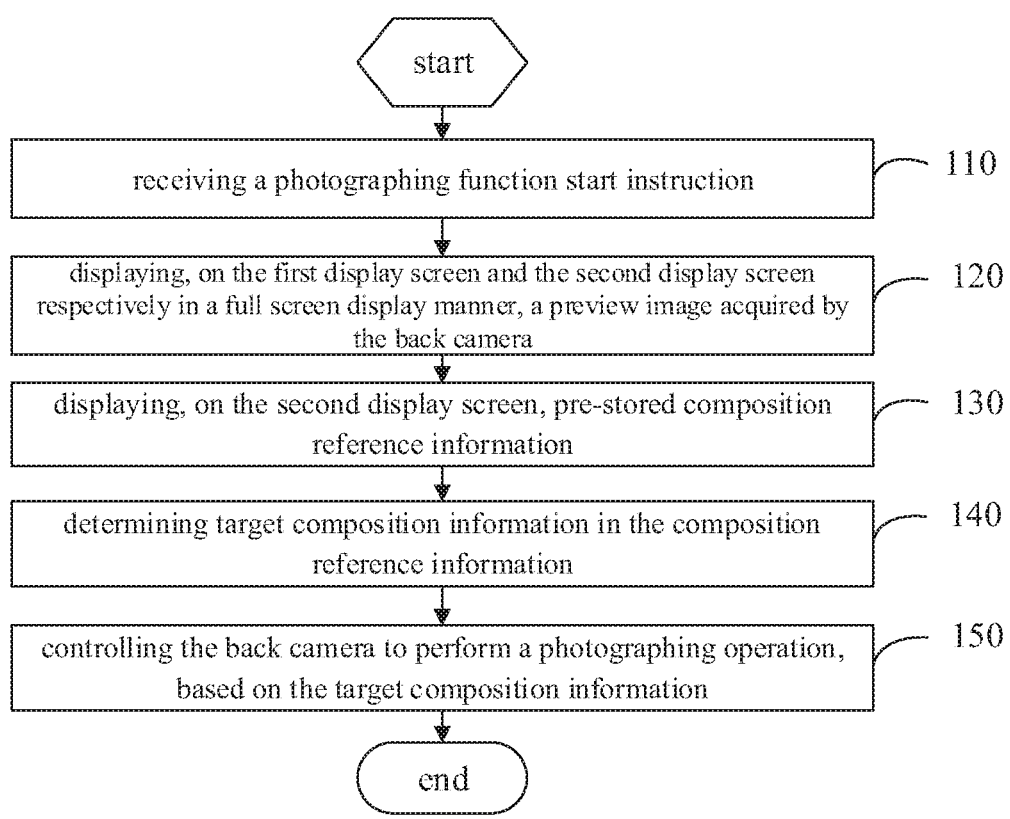
FIG. 1 is a first flowchart of a photographing method in the embodiments of the present disclosure.

FIG. 1 is a flowchart of a photographing method in the embodiments of the present disclosure.

Step 110: receiving a photographing function start instruction.

The user may input the photographing function start instruction in the mobile terminal in any available manner, which is not limited herein. Furthermore, in the embodiments of the present disclosure, when a photographing function start instruction is received, the rear camera of the mobile terminal may be turned on. Of course, if the front camera of the mobile terminal is used for photographing currently, after receiving the photographing function start instruction, the front camera may be turned on directly, which is not limited herein. Moreover, if the mobile terminal has both a front camera and a rear camera, the turning-on of the cameras may also be switched at any time by inputting a camera switching instruction. For example, the turning-on of the cameras may be switched from the front camera to the rear camera, or from the rear camera to the front camera.

Step 120: displaying, on the first display screen and the second display screen respectively in a full screen display manner, a preview image acquired by the rear camera.

In the embodiment of the present disclosure, in order to enable the user and son on, the photographer and the photographed person to browse the preview image of the camera in real time when taking a picture, after the camera of the mobile terminal is started, a preview image acquired by the rear camera may be displayed on the first display screen and the second display screen respectively in a full screen display manner. The mobile terminal in the embodiment of the present disclosure includes a rear camera, and the mobile terminal further includes a first display screen and a second display screen which are oppositely arranged. The rear camera and the second display screen are arranged at the same side. Therefore, in the embodiment of the present disclosure, the second display screen may include a back display screen, and the first display screen may include a front display screen.

In general, the control components of a mobile terminal, such as a photographing control component for inputting a photographing instruction, are generally arranged on the front of the mobile terminal. Therefore, in the embodiment of the present disclosure, in order to facilitate the user to input a photographing instruction while browsing the camera's real-time preview image, the preview image acquired by the camera may be showed on the front display of the mobile terminal. Of course, if the photographing instruction may be input through other methods, such as voice, gestures or other shortcuts, instead of inputting the photographing instruction through the photographing control component on the front of the mobile terminal, then the back display screen of the mobile terminal may be used to show the current preview interface of the camera, which is not limited herein.

Step 130: displaying, on the second display screen, pre-stored composition reference information.

In the embodiment of the present disclosure, in order to facilitate the user to select the target composition information from the pre-stored composition reference information, each composition reference information needs to be shown to the user, especially the photographed object, i.e., the photographed person. In addition, the photographed person also needs to adjust his or her posture according to the target composition information. Therefore, the composition reference information may be displayed on the second display screen of the mobile terminal for the user to select the target composition information. In this case, the rear camera of the mobile terminal is used for photographing. If the front camera of the mobile terminal is used for photographing, the composition reference information may also be shown on the first display screen of the mobile terminal at this time for the user to select the target composition information, which is not limited herein.

Moreover, in the embodiments of the present disclosure, when showing the composition reference information, at least one composition reference information may be displayed each time, and the first composition reference information currently displayed may be used as the target composition information by default. If the photographed person is not satisfied with the current target composition information, the photographed person may input a switching instruction through the preset switching manner to switch the target composition information to the next one. The preset switching manner may be inputting a switching instruction through a voice, or inputting a switching instruction through a preset gesture, and the like. Specifically, such setting may be made before this step or before any step prior to this step, which is not limited herein.

Because the second display screen and the rear camera are arranged at the same side, in order to facilitate the photographed person to independently select the target composition information for the actual photographing from the composition reference information, in the embodiments of the present disclosure, the pre-stored composition reference information may be displayed on the second display screen. The composition reference information displayed on the second display screen may cover a part of the preview image acquired by the camera and displayed on the second display screen, of course, it may also cover all the preview images acquired by the camera and displayed on the second display screen, which is not limited herein.

The composition reference information may be set and stored in a preset storage space according to requirements before this step or before any step prior to this step, which is not limited herein. The preset storage space may be a memory of the mobile terminal, or the local of the mobile terminal, or a cloud server, etc., which is not limited herein.

Moreover, in the embodiment of the present disclosure, it may be set to display only one of the composition reference information on the second display screen at any time, and of course, it may also be set to simultaneously display a plurality of the composition reference information on the second display screen, which is not limited herein.

Optionally, in the embodiment of the present disclosure, Step 130 may further include: displaying the composition reference information on the second display screen in a full screen display manner.

If the composition reference information is displayed on the second display screen in a full screen display manner, then on the second display screen, the composition reference information may cover all the preview image acquired by the camera.

Figure 1A:
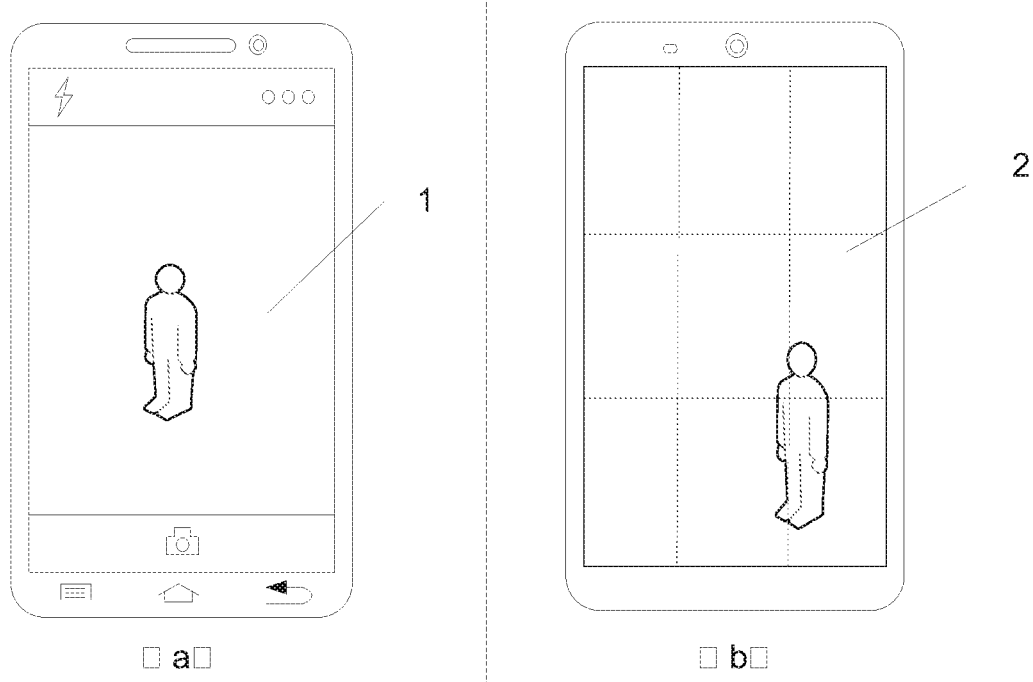
FIG. 1A is a schematic view of displaying a preview image on a full screen of a first display screen and displaying composition reference information on a full screen of a second display screen in the embodiments of the present disclosure.

For example, if the first display screen is the front display screen of the mobile terminal at this time, the second display screen may be the back display screen of the mobile terminal. As shown in FIG. 1A, the part (a) is a schematic view showing a preview image acquired by a camera in a full screen display manner on a first display screen, and part (b) in FIG. 1A is a pre-stored composition reference information displayed in a full screen display manner on a second display screen, where the reference number 1 represents a preview image, and the reference number 2 represents the composition reference information.

Step 140: determining target composition information in the composition reference information.

In order to take a photograph, the target composition information needs to be determined from the displayed composition reference information. Specifically, the target composition information may be selected from the composition reference information according to the selection of the photographed person. In the embodiment of the present disclosure, the photographed person may select target composition information in any available manner, which is not limited herein.

Step 150: controlling the rear camera to perform a photographing operation, based on the target composition information.

Then, after the target composition information is determined, the camera may be controlled to perform a photographing operation based on the currently determined target composition information. Specifically, the rear camera may be controlled to perform a photographing operation in any available manner, which is not limited herein.

According to the embodiments of the present disclosure, a photographing function start instruction is received, a preview image acquired by the rear camera is displayed on the first display screen and the second display screen respectively in a full screen display manner, pre-stored composition reference information is displayed on the second display screen, target composition information in the composition reference information is determined, and the rear camera is controlled to perform a photographing operation, based on the target composition information. The photographed person may see the photographing preview interface and the composition reference information through the back display screen. The photographed person may select the required composition information, so as to obtain an image which the photographed person is satisfied with.

Figure 2:
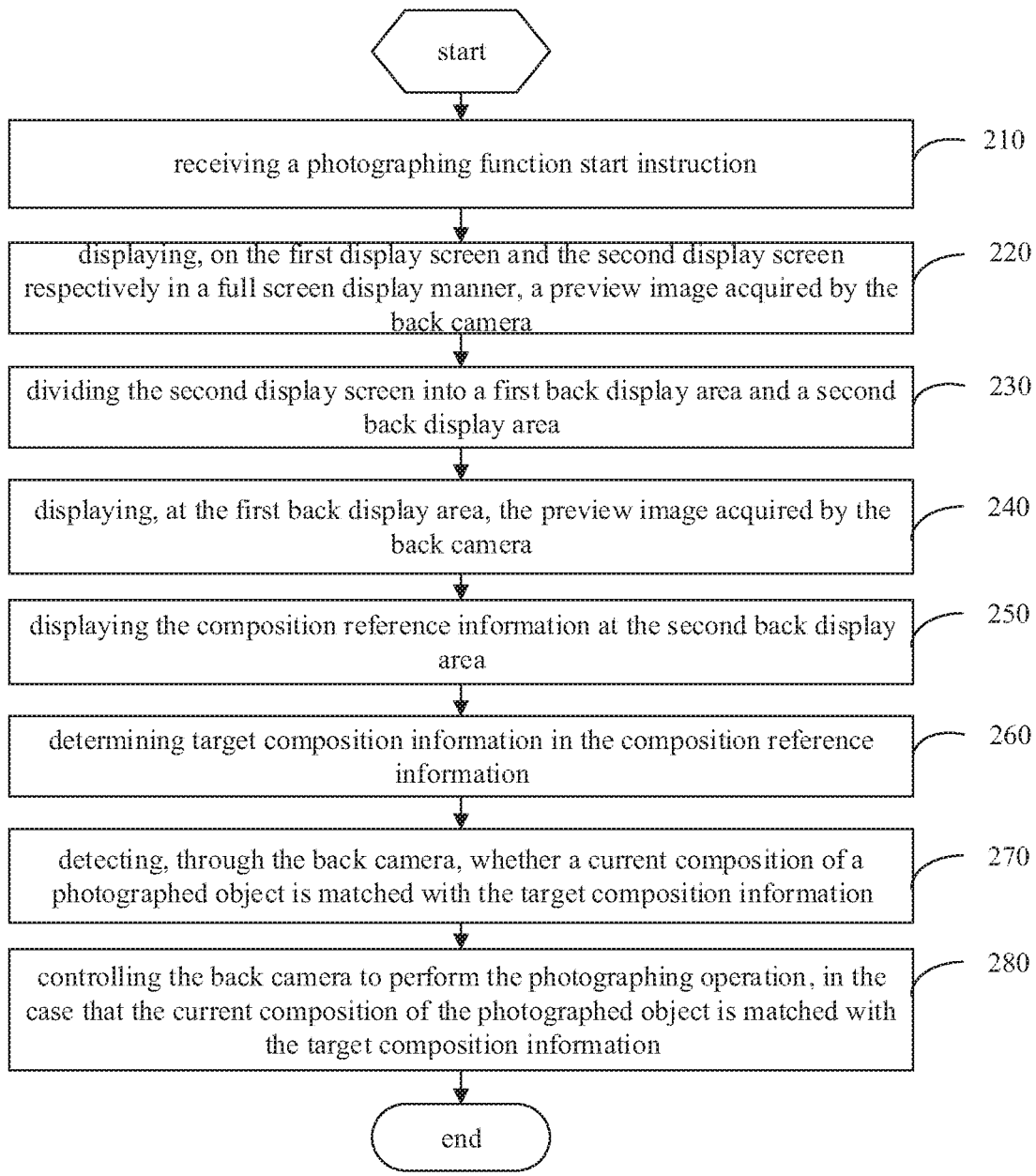
FIG. 2 is a second flowchart of a photographing method in the embodiments of the present disclosure.

FIG. 2 is a flowchart of a photographing method in the embodiments of the present disclosure.

Step 210: receiving a photographing function start instruction.

For example, the photographing function start instruction from user A is received, user A needs to take a group photo of three persons B, C, and D. At this time, persons B, C, and D are the photographed persons. In the embodiment of this application, in order to ensure that the photographed person is able to browse the preview image and/or composition reference information displayed on the second display of the mobile terminal, the distance between the photographed persons B, C and D and the user A may be set within a preset distance range, or the distance between the photographed persons B, C and D and the mobile terminal may be set within a preset distance range, and so on. The preset distance range may be set before this step or before any step prior to this step according to requirements or experience, which is not limited herein.

Step 220: displaying, on the first display screen and the second display screen respectively in a full screen display manner, a preview image acquired by the rear camera.

For example, preview images of three persons B, C, and D acquired by the rear camera are displayed on the first display screen and the second display screen in a full screen manner.

Step 230: dividing the second display screen into a first back display area and a second back display area.

In the embodiment of the present disclosure, in order to facilitate the photographed person to select a satisfied target composition information from the composition reference information according to the preview image of the current camera while taking a photograph, the current preview image and composition reference information of the camera may be simultaneously displayed on the second display screen of the mobile terminal, then the display interface of the second display screen needs to be divided firstly, that is, the second display screen is divided into a first back display area and a second back display area. Specifically, any available method may be used for split screen processing, which is not limited herein. Moreover, when dividing the screen, the display interface of the second display screen may be divided into two sub screens of the same size, or two sub screens of different sizes, which can be specific according to requirements before this step or the size relationship between the two sub screens may be determined before any step before this step, which is not limited herein.

Step 240: displaying, at the first back display area, the preview image acquired by the rear camera.

For example, the previews image of the foregoing B, C, and D persons acquired by the rear camera is displayed at the first back display area.

Step 250: displaying the composition reference information at the second back display area.

After the dividing the screen, the preview image acquired by the rear camera may be displayed at the first back display area, and the composition reference information may displayed at the second back display area for the user to select the target composition information according to the preview image. At least one of the composition reference information may be displayed at the second back display area showing the composition reference information, and the specific quantity of the shown composition reference information may be preset according to requirements, which is not limited in the embodiment of the present disclosure.

Figure 2A:
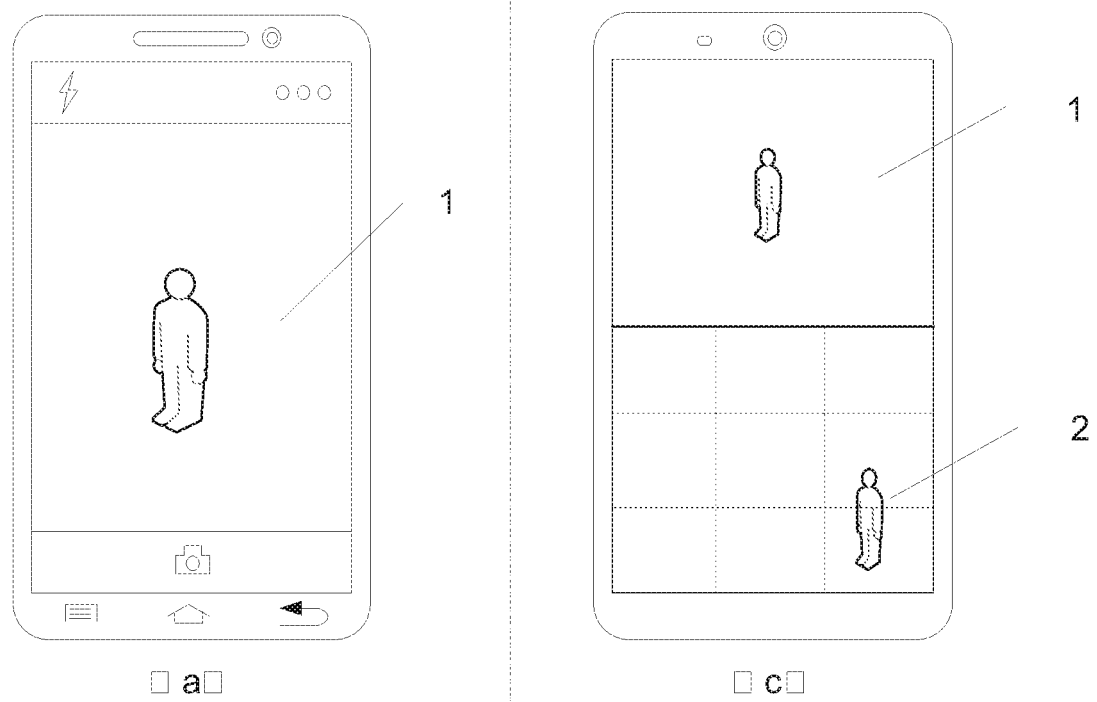
FIG. 2A is a schematic view of displaying a preview image and composition reference information respectively at different display areas of a second display screen in the embodiments of the present disclosure.

The part (c) of FIG. 2A is a schematic view showing a preview image and composition reference information on a second display screen after dividing the screen. It can be seen that the display interface of the second display screen of the mobile terminal is divided into two upper and lower sub screens, where the upper sub screen is the first back display area, and the lower sub screen is the second back display area. Only one of the composition reference information is displayed in the second back display area each time.

Step 260: determining target composition information in the composition reference information.

For example, for the photographed persons B, C, and D, the target composition information currently used for photographing may be selected from the composition reference information displayed at the second back display area.

Step 270: detecting, through the rear camera, whether a current composition of a photographed object is matched with the target composition information.

Before photographing, the photographed object needs to adjust the current composition according to the target composition information to match the target composition information; otherwise, the photographing effect may still be unsatisfied. If the photographer can adjust the current composition, the photographed object at this time may be the photographer, and if the photographed person may adjust the current composition, the photographing at this time may correspond to the photographed person, which is not limited herein. Therefore, in order to ensure the photographing effect, it is required to detect by the rear camera whether the current composition of the photographed object matches the target composition information. The matching criteria may be set according to requirements before this step or before any step prior to this step, which is not limited in this embodiment of the present disclosure.

For example, for the above photographed object, i.e., the photographed persons B, C, and D at this time, after they selected the target composition information, in order to ensure that the photographed persons B, C, and D are satisfied with the photographing effects, the photographing may be performed referring to the target composition information. In the embodiment of the present disclosure, the rear camera may be used to detect whether the current composition of the photographed persons B, C, and D match with the target composition information.

In order to enable the current composition of the photographed persons B, C and D to be matched with the target composition information, it is necessary for persons B, C, and D to adjust their position, postures, and the like with reference to the target composition information, so that the current composition corresponding to the persons B, C, and D match with the target composition information.

Step 280: controlling the rear camera to perform the photographing operation, in the case that the current composition of the photographed object is matched with the target composition information.

In the case that the current composition of the photographed object is matched with the target composition information, the rear camera may be triggered to perform the photographing operation. Of course, in the embodiment of the present disclosure, in the case that the current composition of the photographed object is matched with the target composition information, the rear camera may be triggered to perform the photographing operation by any other available method, which is not limited in the embodiment of the present disclosure.

For example, if it is detected that the current composition of the photographed persons B, C, and D match the selected target composition information, the rear camera may be controlled to perform a photographing operation to photographed persons B, C, and D.

According to the embodiments of the present disclosure, a photographing function start instruction is received, a preview image acquired by the rear camera is displayed on the first display screen and the second display screen respectively in a full screen display manner, pre-stored composition reference information is displayed on the second display screen, target composition information in the composition reference information is determined, and the rear camera is controlled to perform a photographing operation, based on the target composition information. The photographed person may see the photographing preview interface and the composition reference information through the back display screen. The photographed person may select the required composition information, so as to obtain an image which the photographed person is satisfied with.

Furthermore, in the embodiment of the present disclosure, the second display screen may be divided into the first back display area and the second back display area; the first back display area displays the preview image acquired by the rear camera; the composition reference information is displayed at the second back display area. Therefore, it is more convenient for the photographed person to determine the target composition information from the composition reference information according to the preview image, and the photographed person may be more satisfied with the photographed images.

In addition, in the embodiment of the present disclosure, it is also able to detect whether the current composition of the photographed object matches with the target composition information through the rear camera. If it is detected that the current composition of the photographed object matches with the target composition information, the rear camera is controlled to perform the photographing operation, therefore the photographing and the composition may be performed based on the target composition information, and the photographed person may be more satisfied with the photographed images.

Figure 3:
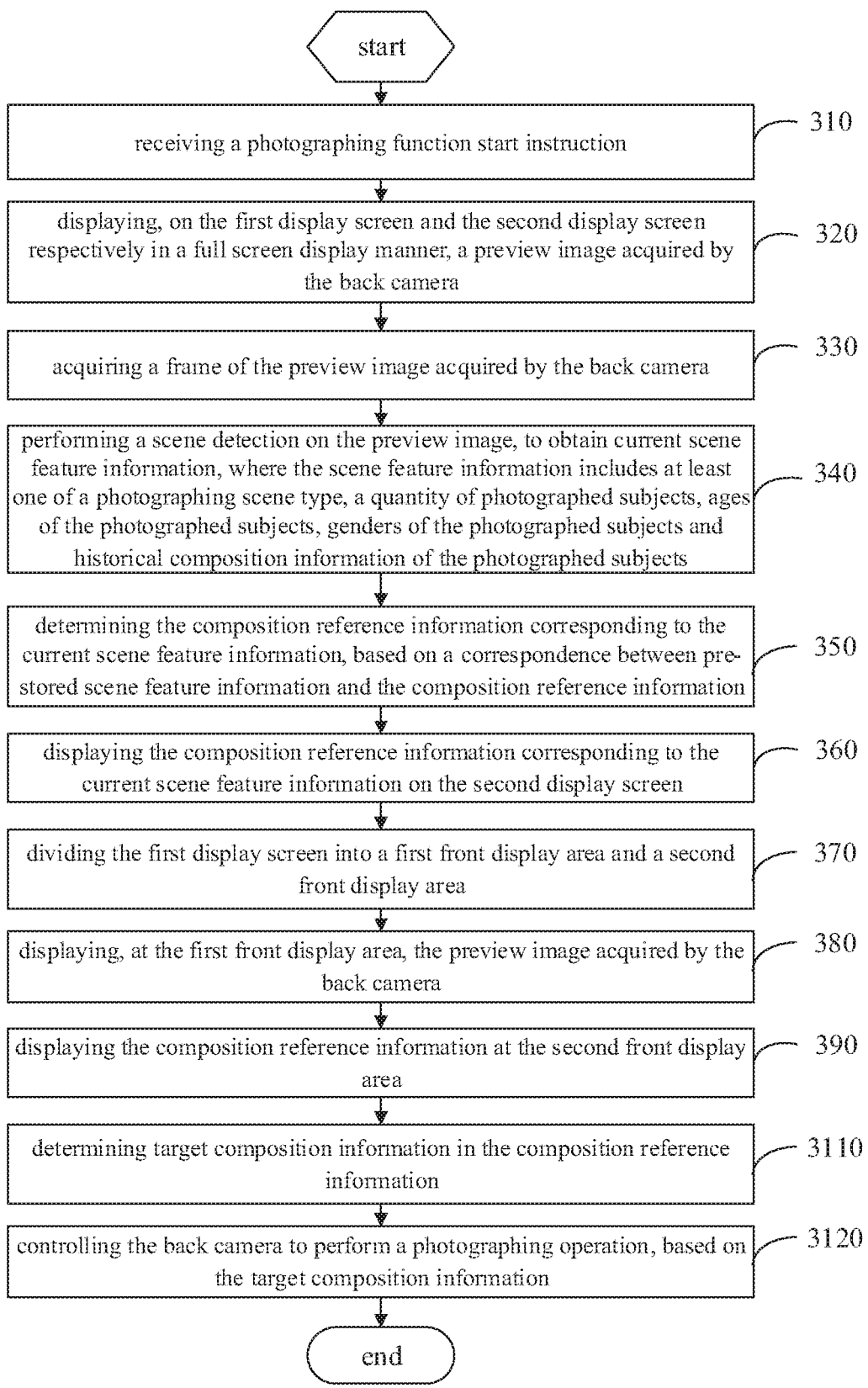
FIG. 3 is a third flowchart of a photographing method in the embodiments of the present disclosure.

FIG. 3 is a flowchart of a photographing method in the embodiments of the present disclosure.

Step 310: receiving a photographing function start instruction.

For example, the photographing function start instruction from user A is received, user A needs to take a group photo of three persons B, C, and D. At this time, persons B, C, and D are the photographed persons. In the embodiment of this application, in order to ensure that the photographed person is able to browse the preview image and/or composition reference information displayed on the second display of the mobile terminal, the distance between the photographed persons B, C and D and the user A may be set within a preset distance range, or the distance between the photographed persons B, C and D and the mobile terminal may be set within a preset distance range, and so on. The preset distance range may be set before this step or before any step prior to this step according to requirements or experience, which is not limited herein.

Step 320: displaying, on the first display screen and the second display screen respectively in a full screen display manner, a preview image acquired by the rear camera.

For example, preview images of three persons B, C, and D acquired by the rear camera are displayed on the first display screen and the second display screen in a full screen manner.

Step 330: acquiring a frame of the preview image acquired by the rear camera.

The first frame of preview image acquired after the start function of the photographing function is received and the rear camera is started may be acquired, or any frame of preview image acquired by the rear camera may be randomly acquired, or a frame of preview image acquired by the rear camera and meeting certain performance requirements may be acquired, the present disclosure is not limited herein. Moreover, the performance requirements herein may include sharpness, brightness, resolution, and the like, which are not limited in the embodiments of the present disclosure.

For example, a frame of preview image of the photographed persons B, C, and D acquired by the rear camera is acquired.

Step 340: performing a scene detection on the preview image, to obtain current scene feature information, where the scene feature information includes at least one of a photographing scene type, a quantity of photographed subjects, ages of the photographed subjects, genders of the photographed subjects and historical composition information of the photographed subjects.

In practical applications, composition reference information for different scenes may be stored in advance. In each photographing process, if all the pre-stored composition reference information is displayed one by one for the user to select the target composition information, the selected target composition information at this time may not be matched with the current photographing scene, resulting in that the photographing effect is still not good and the user may need to select other target composition information, which may complicate the user operations. Therefore, in the embodiment of the present disclosure, only the composition reference information corresponding to the current scene feature information may be displayed on the second display screen, and then the scene detection needs to be performed on the preview image to obtain the current scene feature information. The scene detection may be performed on the preview image through any available methods, and specifically, it may be set according to the content in the current scene feature information to be acquired currently, which is not limited in this embodiment of the present disclosure.

The scene feature information includes at least one of a photographing scene type, a quantity of photographed subjects, ages of the photographed subjects, genders of the photographed subjects and historical composition information of the photographed subjects. For example, the photographing scene type may include office scenes, entertainment scenes, outdoor scenes, home scenes, and so on, and standard scene parameters corresponding to each scene type may also be defined. In the embodiment of the present disclosure, a photographing scene type, a quantity of photographed subjects, ages of the photographed subjects, genders of the photographed subjects and historical composition information of the photographed subjects may be detected through any method or device, which is not limited herein.

For example, the scene detection is performed on the frame of acquired preview image including the persons B, C, and D to obtain the current scene feature information. If the scenes of the persons B, C, and D are office scenes, the types of photographing scenes that can be detected are office scenes. The composition information previously used by the persons B, C, and D includes composition information g and h, then it is able to detect that the historical composition information of the photographed objects includes g, h, and so on.

Step 350: determining the composition reference information corresponding to the current scene feature information, based on a correspondence between pre-stored scene feature information and the composition reference information.

As mentioned above, in the embodiment of the present disclosure, the composition reference information may be stored in advance, and then after obtaining the current scene feature information, the composition reference information corresponding to the current scene feature information may be determined according to the correspondence between the pre-stored scene feature information and the composition reference information. The corresponding between the scene feature information and the composition reference information may be set according to requirements before this step, or before any step prior to this step according to requirements, which is not limited in this embodiment of the present disclosure.

As mentioned above, the scene feature information includes at least one of a photographing scene type, a quantity of photographed subjects, ages of the photographed subjects, genders of the photographed subjects and historical composition information of the photographed subjects. Then the corresponding between the scene feature information and the composition reference information may include, but is not limited to, at least one of the corresponding set according to the photographing scene type, the corresponding set according to the quantity of photographed objects, the corresponding set according to the age of the photographed objects, the correspondence set according to the gender of the photographed objects and the correspondence set according to the historical composition information of the photographed objects, which may be preset according to requirements or the content included in scene feature information, which is not limited in the embodiment of the present disclosure.

If the composition reference information that matches with the current scene feature information cannot be determined based on the correspondence between the pre-stored scene feature information and the composition reference information, the mobile terminal may be controlled to provide prompts, such as voice prompts or pop-up prompts. After receiving the prompt, the user of the mobile terminal can also add composition reference information that matches with the feature information of the current scene according to requirements, which is not limited in this embodiment of the present disclosure.

For example, for the foregoing preview image including photographed objects B, C, and D, after acquiring the current scene feature information corresponding to the preview image, the composition reference information that matches with the current scene feature information may be determined based on the correspondence between the pre-stored scene feature information and the composition reference information.

Optionally, in the embodiment of the present disclosure, the composition reference information includes at least one composition reference image.

In the embodiment of the present disclosure, the composition reference information may be reference information for composing a scene to be photographed currently, for example, the relative position reference information of each object in the current scene, and the position reference information of each object relative to a photographing range boundary, or the photographing angle reference information, photographing brightness reference information, photographing focus distance reference information, and so on. In addition, the composition reference information may further include photographing posture reference information to prompt the photographed objects to adjust the photographing posture, and so on.

In order to provide a visual prompt to the user, in the embodiment of the present disclosure, the composition reference information may include at least one composition reference image. Then, the composition reference image may include the relative position reference information of each object, the position reference information of each object relative to the boundary of the photographing range, the photographing posture reference information, and so on. Then the user may adjust each photographed object according to the composition reference image, that is, the relative position and posture of the photographed object, and so on.

Step 360: displaying the composition reference information corresponding to the current scene feature information on the second display screen.

After determining the composition reference information corresponding to the current scene feature information, in order to facilitate the user to select the target composition information from the composition reference information, the composition reference information corresponding to the current scene feature information still needs to be displayed on the second display screen.

It should be noted that if the composition reference information includes at least one composition reference image, at this time, it is able to set to display only one composition reference image on the second display at any time, or to display on the second display at any time a preset quantity of composition reference images, and the preset quantity may be preset according to requirements, which is not limited in the embodiment of the present disclosure.

For example, the composition reference information corresponding to the current scene feature information corresponding to the preview image including the photographed object B, C, and D is displayed on the second display screen.

Optionally, in the embodiment of the present disclosure, step 360 may further include: displaying a preset composition reference image of the at least one composition reference image on the second display screen; or displaying, on the second display screen, a preset quantity of composition reference images of the at least one composition reference image, in an order from the composition reference image used most frequently to the composition reference image used least frequently.

In the embodiment of the present disclosure, in order to avoid confusion when displaying the composition reference image, a preset composition reference image of the at least one preset composition reference image included in the composition reference information corresponding to the current scene feature information may be displayed on the second display screen. The preset composition reference image may be preset according to requirements. For example, it can be a composition reference image which used most frequently, which is not limited herein.

In addition, a preset quantity of composition reference images of the at least one composition reference image may be displayed on the second display screen, in an order from the composition reference image used most frequently to the composition reference image used least frequently. The preset quantity may be set according to requirements before this step, or before any step prior to this step, which is not limited in this embodiment of the present disclosure.

Of course, in the embodiments of the present disclosure, the composition reference images may also be displayed in any other available order, which is not limited in the embodiments of the present disclosure. Moreover, in the embodiment of the present disclosure, the display order of the composition reference images corresponding to different display screens of the same mobile terminal may be the same or different, which is not limited in this embodiment of the present disclosure. For example, for the foregoing composition reference images a, b, and c corresponding to the current scene feature information, it can be determined that for the first display screen and the second display screen of the current mobile terminal, the display order of the composition reference images is c, b, a. It can also be determined that for the first display screen of the current mobile terminal, the display order of the composition reference images is c, b, a, and for the second display screen of the current mobile terminal, the display order of the composition reference images is a, b, c.

Step 370: dividing the first display screen into a first front display area and a second front display area.

In practical applications, the photographer can also help the photographed person to select the target composition information according to the preview image of the camera. At this time, the preview image of the camera and the composition reference information can be simultaneously displayed on the first display screen of the mobile terminal. Then, the display interface of the first display screen needs to be divided, that is, the first display screen is divided into a first front display area and a second front display area. At this time, the first display screen may also be divided in any available manner, which is not limited in the embodiment of the present disclosure.

Step 380: displaying, at the first front display area, the preview image acquired by the rear camera.

For example, the first front display area displays the preview image including persons B, C, and D acquired by the rear camera.

Step 390: displaying the composition reference information at the second front display area.

After dividing the screen, the preview image of the camera may also be displayed on one of the sub screens, and the composition reference information may be displayed on the other sub screen for the photographer to select the target composition information based on the preview image. That is, the preview image acquired by the rear camera is displayed at the first front display area, and the composition reference information is displayed at the second front display area.

Figure 3A:
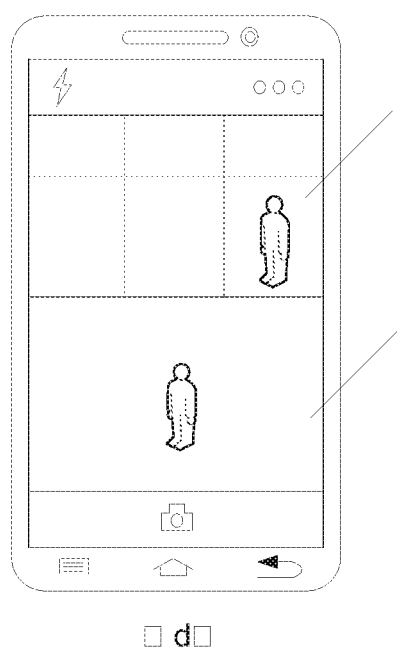
FIG. 3A is a schematic view of displaying a preview image and composition reference information respectively at different display areas of a first display screen in the embodiments of the present disclosure.
Figure 3A:
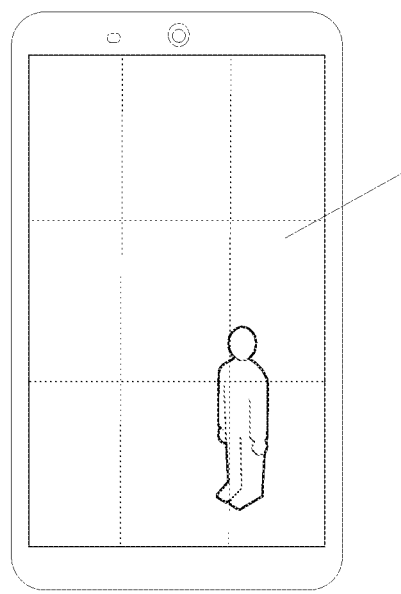

The part (d) of FIG. 3A is a schematic view showing a preview image and composition reference information on a first display screen after dividing the screen. It can be seen that the display interface of the first display screen of the mobile terminal is divided into two upper and lower sub screens, where the upper sub screen is a second front display area, and the lower sub screen is a first front display area. Only one of the composition reference information is displayed at the second front display area at this time.

Moreover, if the composition reference information is displayed on the first display screen of the mobile terminal, at this time, the photographer can also slide the second front display area in the first display screen or click the second front display of the first display screen to switch the displayed composition reference image, which may be set in advance according to requirements, which is not limited in the embodiment of the present disclosure. Moreover, at this time, the composition reference image displayed on the first display screen of the mobile terminal may be synchronized with the composition reference image displayed on the second display screen of the mobile terminal, or may not be synchronized therewith, and the switching of the composition reference image of the first display screen and the second display screen may also be unsynchronized or synchronized, which may be preset according to requirements and not limited in the embodiment of the present disclosure.

If in the embodiment of the present disclosure, the target composition reference image displayed on the first display screen or the second display screen is used as the target composition information, then if the switching of the composition reference image on the first display screen and the second display screen is not synchronized, then the priorities of the first display screen and the second display screen may be set in advance, and when a photographing instruction is received, the photographing may be performed based on a target composition reference image in the display screen with a higher priority.

For example, suppose there are three composition reference images matched with the current scene, namely composition reference image a, composition reference image b and composition reference image c. At this time, the target composition reference image displayed on the first display screen of the mobile terminal is composition reference image b, and the target composition reference image displayed on the second display screen of the mobile terminal is the composition reference image a. If the preset priority of the first display screen of the mobile terminal is higher than that of the second display screen of the mobile terminal, then a photographing operation may be performed based on the composition reference image b.

Step 3110: determining target composition information in the composition reference information.

Step 3120: controlling the rear camera to perform a photographing operation, based on the target composition information.

Figure 4:
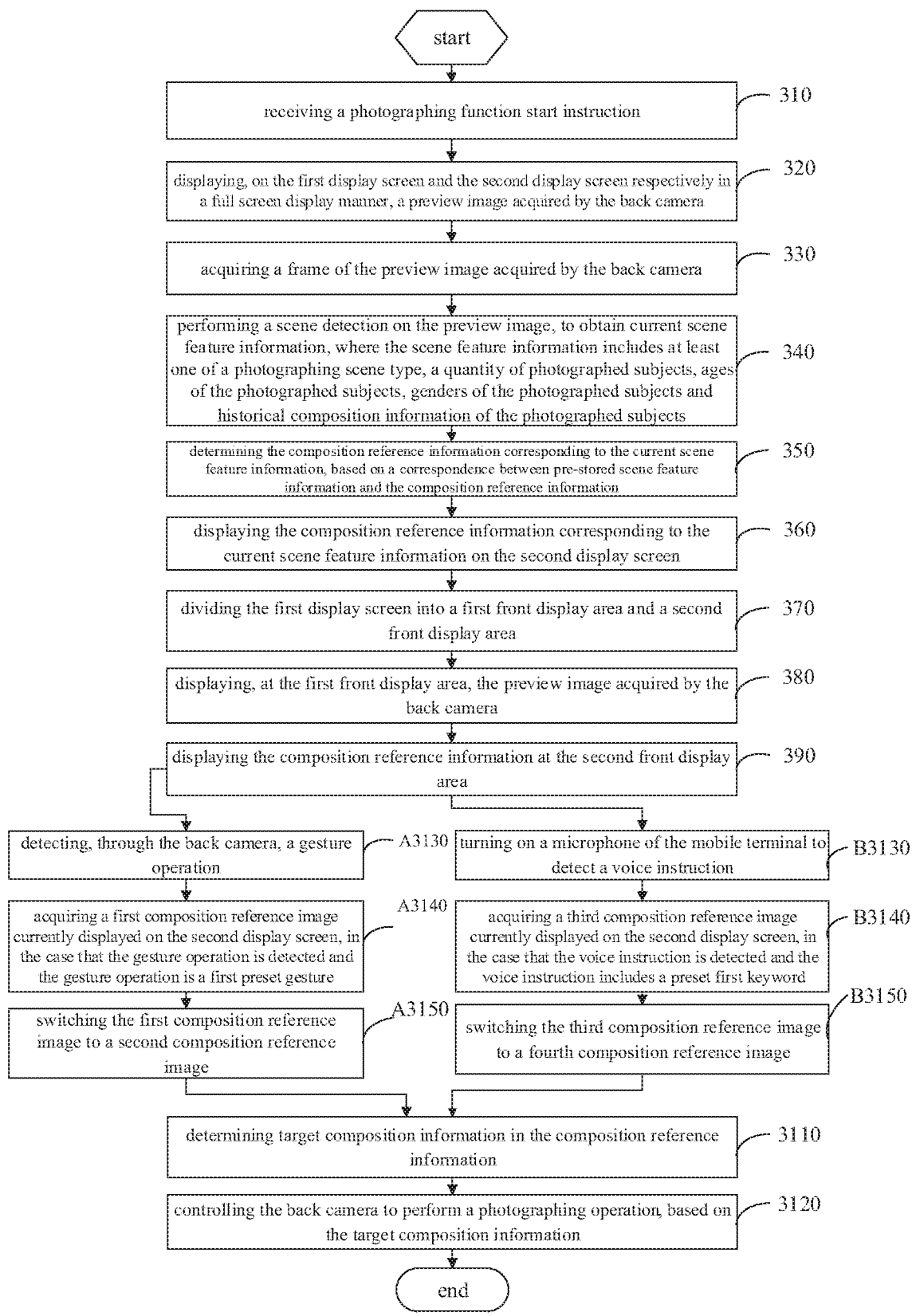
FIG. 4 is a fourth flowchart of a photographing method in the embodiments of the present disclosure.

Optionally, referring to FIG. 4, in the embodiment of the present disclosure, before the step 3110 and after the step 390, the method may further include:

Step A3130: detecting, through the rear camera, a gesture operation;

Step A3140: acquiring a first composition reference image currently displayed on the second display screen, in the case that the gesture operation is detected and the gesture operation is a first preset gesture;

Step A3150: switching the first composition reference image to a second composition reference image.

Optionally, in the embodiment of the present disclosure, the step 3110 may further include: determining the composition reference image currently displayed on the second display screen as the target composition information, in the case that the gesture operation is detected and the gesture operation is a second preset gesture.

In practical applications, it is difficult for the photographed person to switch the currently displayed composition reference image by touching the mobile terminal. Therefore, in the embodiment of the present disclosure, the first preset gesture may be set in advance, and the rear camera may detect the gesture operation. If a gesture operation is detected and the gesture operation is the first preset gesture, the first composition reference image currently displayed on the second display screen may be acquired, then the first composition reference image is switched to the second composition reference image. The first preset gesture may be set according to requirements before this step or before any step prior to this step, which is not limited in this embodiment of the present disclosure. The second composition reference image may include a composition reference image in the second display screen to be displayed after the first composition reference image.

In addition, if a gesture operation is detected and the gesture operation is a second preset gesture, the composition reference image currently displayed on the second display screen is determined as the target composition information. The second preset gesture may be set according to requirements before this step or before any step prior to this step, which is not limited in this embodiment of the present disclosure.

For example, if the current photographed objects are three persons B, C and D, then the gesture operations of the three persons B, C, and D can be detected through the rear camera at this time. If a gesture operation of at least one of B, C and D is detected and the gesture operation is the first preset gesture, the first composition reference image currently displayed on the second display screen may be acquired, and then the first composition reference image is switched to the second composition reference image.

Optionally, in the embodiment of the present disclosure, the step 3120 may further include: controlling the rear camera to perform the photographing operation, in the case that the gesture operation is detected and the gesture operation is a third preset gesture.

Moreover, the user may also control the rear camera to perform a photographing operation through gestures. Specifically, if the rear camera detects a gesture operation and the gesture operation is a third preset gesture, the rear camera may be controlled to perform a photographing operation. The third preset gesture may be set according to requirements before this step or before any step prior to this step, which is not limited in this embodiment of the present disclosure.

Furthermore, in order to distinguish the operations corresponding to the input gestures, it is necessary to set the first preset gesture, the second preset gesture, and the third preset gesture to be different from each other.

For example, if a gesture operation of at least one of persons B, C and D is detected and the gesture operation is the third preset gesture, the rear camera is controlled to perform a photographing operation.

Optionally, referring to FIG. 4, in the embodiment of the present disclosure, before the step 3110 and after the step 390, the method may further include:

Step B3130: turning on a microphone of the mobile terminal to detect a voice instruction;

Step B3140: acquiring a third composition reference image currently displayed on the second display screen, in the case that the voice instruction is detected and the voice instruction includes a preset first keyword;

Step B3150: switching the third composition reference image to a fourth composition reference image.

In addition, in the embodiment of the present disclosure, the mobile terminal may also be controlled by a voice instruction to perform switching of a composition reference image, determine target composition information, control a rear camera to perform a photographing operation, and the like. Then at this time, the microphone of the mobile terminal needs to be turned on to detect a voice instruction. If a voice instruction is detected and the voice instruction includes a preset first keyword, a third composition reference image currently displayed on the second display screen may be acquired, and then the third composition reference image is switched to a fourth composition reference image. The fourth composition reference image may include a composition reference image in the second display screen to be displayed after the third composition reference image.

For example, if the current photographed objects are B, C, and D, then the microphone of the mobile terminal may be turned on to detect voice instructions. If a voice instruction of at least one of B, C, and D is detected and the voice instruction includes a preset first keyword, a third composition reference image currently displayed on the second display screen is obtained, and then the third composition reference image may be switched to the fourth composition reference image.

Optionally, in the embodiment of the present disclosure, the step 3110 may further include: determining the composition reference image currently displayed on the second display screen as the target composition information, in the case that the voice instruction is detected and the voice instruction includes a preset second keyword.

Then, when determining the target composition information, when a voice instruction is detected and the voice instruction includes a preset second keyword, the composition reference image currently displayed on the second display screen is determined as the target composition information.

For example, if a voice instruction of at least one of persons B, C and D is detected and the voice instruction includes a preset second keyword, the composition reference image currently displayed on the second display screen is determined as the target composition information.

Optionally, in the embodiment of the present disclosure, the step 3120 may further include: controlling the rear camera to perform the photographing operation, in the case that the voice instruction is detected and the voice instruction includes a preset third keyword.

In addition, the rear camera can also be controlled by a voice instruction to perform a photographing operation, that is, if a voice command is detected and the voice command includes a preset third keyword, the rear camera is controlled to perform a photographing operation.

For example, if a voice instruction of at least one of persons B, C, and D is detected and the voice instruction includes a preset third keyword, the rear camera is controlled to perform a photographing operation.

It should be noted that in order to distinguish different voice instructions corresponding to different operations, the first keyword, the second keyword, and the third keyword may be set to be different from each other.

In the embodiment of the present disclosure, the preview image and the composition reference information acquired by the rear camera may also be displayed on both the first display screen and the second display screen at the same time, and then the second display screen may be divided into a first back display area and a second back display area, the preview image acquired by the rear camera is displayed at the first back display area, and the composition reference information is displayed at the second back display area. At the same time, the first display screen is divided into a first front display area and a second front display area, and a preview image acquired by the rear camera is displayed at the first front display area, and the composition reference information is displayed at the second front display area. Then, at this time, both the photographer and the photographed person may select the target composition information from the composition reference information according to the preview image, and the photographer may select the target composition information from the composition reference information, switch the target composition information or control the camera to perform the photographing operation, by touching the mobile terminal display screen, inputting voice instructions and other available methods, which is not limited in this embodiment of the present disclosure. At this time, the photographer and the photographed person may discuss with each other, so the photographing effect may be satisfied by both the photographer and the photographed person.

Figure 3B:
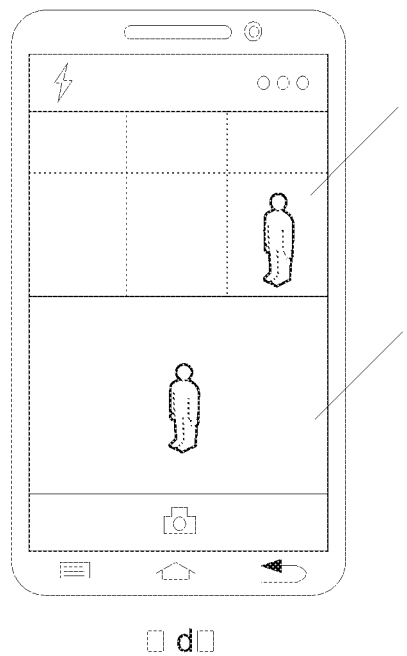
FIG. 3B is a schematic view of displaying a preview image and composition reference information respectively at different display areas of both a first display screen and a second display screen in the embodiments of the present disclosure.
Figure 3B:
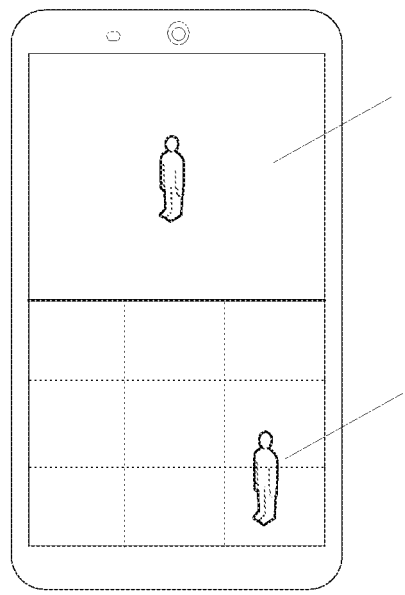

FIG. 3B is a schematic view of displaying a preview image and composition reference information on both a first display screen and a second display screen simultaneously in the embodiments of the present disclosure. The part (d) is a schematic view of the first display screen, and (c) is a schematic view of the second display screen.

According to the embodiments of the present disclosure, a photographing function start instruction is received, a preview image acquired by the rear camera is displayed on the first display screen and the second display screen respectively in a full screen display manner, pre-stored composition reference information is displayed on the second display screen, target composition information in the composition reference information is determined, and the rear camera is controlled to perform a photographing operation, based on the target composition information. The photographed person may see the photographing preview interface and the composition reference information through the back display screen. The photographed person may select the required composition information, so as to obtain an image which the photographed person is satisfied with.

Furthermore, in the embodiment of the present disclosure, the first display screen may be divided into a first front display area and a second front display area; the first front display area displays the preview image acquired by the rear camera; the composition reference information is displayed at the second front display area. Therefore, it is more convenient for the photographer to determine the target composition information from the composition reference information according to the preview image and direct the photographed person to perform a composition based on the target composition information, and the photographed person may be more satisfied with the photographed images.

In addition, in the embodiment of the present disclosure, a frame of the preview image acquired by the rear camera is acquired; a scene detection is performed on the preview image, to obtain current scene feature information; the composition reference information corresponding to the current scene feature information is determined, based on a correspondence between pre-stored scene feature information and the composition reference information; and the composition reference information corresponding to the current scene feature information is displayed on the second display screen; where the scene feature information includes at least one of a photographing scene type, a quantity of photographed subjects, ages of the photographed subjects, genders of the photographed subjects and historical composition information of the photographed subjects. Therefore, only the composition reference information corresponding to the current scene may be displayed on the second display screen, thereby effectively preventing the user from selecting target composition information that does not correspond to the current scene, and reducing the user operations.

Furthermore, in the embodiments of the present disclosure, the mobile terminal may also be controlled by voice instructions or gesture operations to switch composition reference images, determine target composition information, control the rear camera to perform the photographing operation, etc., thereby facilitating user operations.

Figure 5:
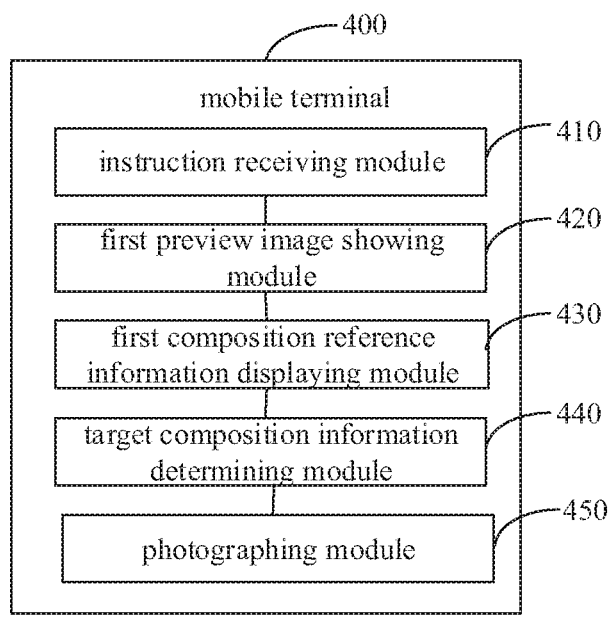
FIG. 5 is a first schematic view of a mobile terminal in the embodiments of the present disclosure.

FIG. 5 is a first schematic view of a mobile terminal in the embodiments of the present disclosure.

The mobile terminal 400 in the embodiments of the present disclosure includes: a rear camera, a first display screen and a second display screen oppositely arranged, where the rear camera and the second display screen are arranged at the same side, and the mobile terminal further includes: an instruction receiving module 410, a first preview image showing module 420, a first composition reference information displaying module 430, a target composition information determining module 440 and a photographing module 450.

The functions of the above modules and the interaction there between will be described in the following.

the instruction receiving module 410 is configured to receive a photographing function start instruction;

the first preview image showing module 420 is configured to display, on the first display screen and the second display screen respectively in a full screen display manner, a preview image acquired by the rear camera;

the first composition reference information displaying module 430 is configured to display, on the second display screen, pre-stored composition reference information;

the target composition information determining module 440 is configured to determine target composition information in the composition reference information; and the photographing module 450 is configured to control the rear camera to perform a photographing operation, based on the target composition information.

Optionally, the first composition reference information displaying module 430 is further configured to display the composition reference information on the second display screen in a full screen display manner.

Figure 6:
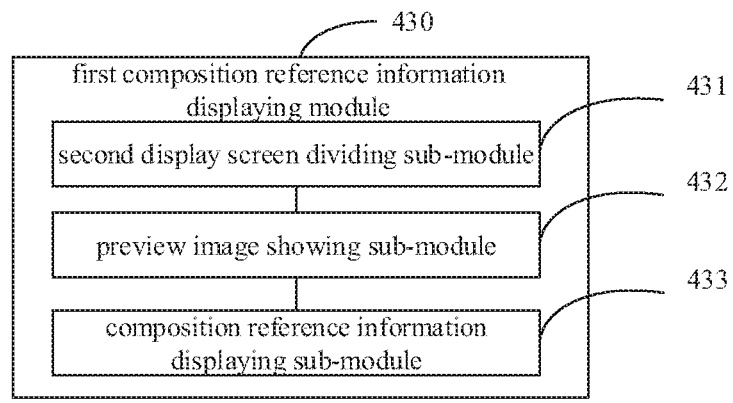
FIG. 6 is first schematic block view of a first composition reference information display module in the embodiments of the present disclosure.

Optionally, as shown in FIG. 6, the first composition reference information displaying module 430 includes: a second display screen dividing sub-module 431, configured to divide the second display screen into a first back display area and a second back display area; a preview image showing sub-module 432, configured to display, at the first back display area, the preview image acquired by the rear camera; and a composition reference information displaying sub-module 433, configured to display the composition reference information at the second back display area.

Figure 7:
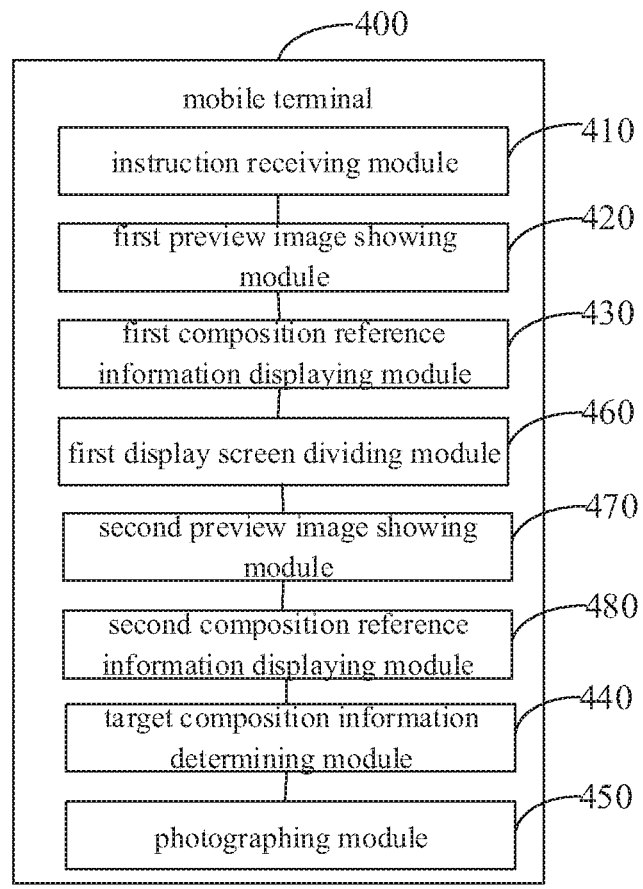
FIG. 7 is a second schematic view of a mobile terminal in the embodiments of the present disclosure.

As shown in FIG. 7, based on FIG. 5, the mobile terminal 400 further includes:

a first display screen dividing module 460, configured to divide the first display screen into a first front display area and a second front display area:

a second preview image showing module 470, configured to display, at the first front display area, the preview image acquired by the rear camera; and a second composition reference information displaying module 480, configured to display the composition reference information at the second front display area.

Figure 8:
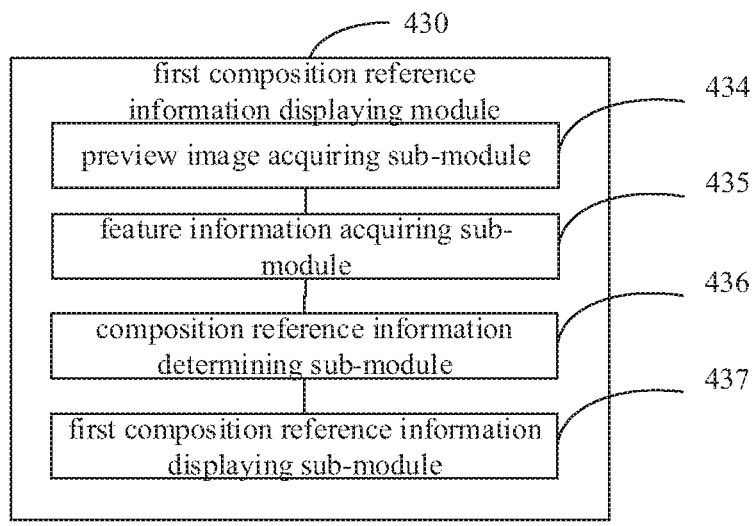
FIG. 8 is a second schematic block view of a first composition reference information display module in the embodiments of the present disclosure.

Optionally, as shown in FIG. 8, the first composition reference information displaying module 430 includes: a preview image acquiring sub-module 434, configured to acquire a frame of the preview image acquired by the rear camera; a feature information acquiring sub-module 435, configured to perform a scene detection on the preview image, to obtain current scene feature information; a composition reference information determining sub-module 436, configured to determine the composition reference information corresponding to the current scene feature information, based on a correspondence between pre-stored scene feature information and the composition reference information; and a first composition reference information displaying sub-module 437, configured to display the composition reference information corresponding to the current scene feature information on the second display screen, where the scene feature information includes at least one of a photographing scene type, a quantity of photographed subjects, ages of the photographed subjects, genders of the photographed subjects and historical composition information of the photographed subjects.

Optionally, the composition reference information includes at least one composition reference image.

Optionally, the first composition reference information displaying sub-module 437 is further configured to: display a preset composition reference image of the at least one composition reference image on the second display screen; or display, on the second display screen, a preset quantity of composition reference images of the at least one composition reference image, in an order from the composition reference image used most frequently to the composition reference image used least frequently.

Optionally, the mobile terminal 400 further includes: a gesture operation detecting module, configured to detect, through the rear camera, a gesture operation; a first composition reference image acquiring module, configured to acquire a first composition reference image currently displayed on the second display screen, in the case that the gesture operation is detected and the gesture operation is a first preset gesture; and a first composition reference image switching module, configured to switch the first composition reference image to a second composition reference image.

Optionally, the target composition information determining module 440 is further configured to determine the composition reference image currently displayed on the second display screen as the target composition information, in the case that the gesture operation is detected and the gesture operation is a second preset gesture.

Optionally, the photographing module 450 is further configured to control the rear camera to perform the photographing operation, in the case that the gesture operation is detected and the gesture operation is a third preset gesture.

Optionally, the mobile terminal further includes: a detection voice turning-on module, configured to turn on a microphone of the mobile terminal to detect a voice instruction; a third composition reference image acquiring module, configured to acquire a third composition reference image currently displayed on the second display screen, in the case that the voice instruction is detected and the voice instruction includes a preset first keyword; a second composition reference image switching module, configured to switch the third composition reference image to a fourth composition reference image.

Optionally, the target composition information determining module 440 is further configured to determine the composition reference image currently displayed on the second display screen as the target composition information, in the case that the voice instruction is detected and the voice instruction includes a preset second keyword.

Optionally, the photographing module 450 is further configured to control the rear camera to perform the photographing operation, in the case that the voice instruction is detected and the voice instruction includes a preset third keyword.

Figure 9:
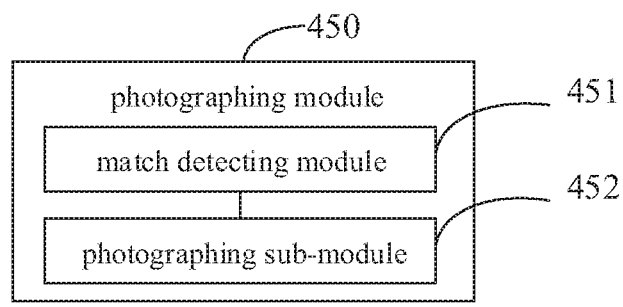
FIG. 9 is a schematic block view of a photographing module in the embodiments of the present disclosure.

Optionally, as shown in FIG. 9, the photographing module 450 includes: a match detecting module 451, configured to detect, through the rear camera, whether a current composition of a photographed object is matched with the target composition information; a photographing sub-module 452, configured to control the rear camera to perform the photographing operation, in the case that the current composition of the photographed object is matched with the target composition information.

According to the embodiments of the present disclosure, a photographing function start instruction is received, a preview image acquired by the rear camera is displayed on the first display screen and the second display screen respectively in a full screen display manner, pre-stored composition reference information is displayed on the second display screen, target composition information in the composition reference information is determined, and the rear camera is controlled to perform a photographing operation, based on the target composition information. The photographed person may see the photographing preview interface and the composition reference information through the back display screen. The photographed person may select the required composition information, so as to obtain an image which the photographed person is satisfied with.

Furthermore, in the embodiment of the present disclosure, the second display screen may be divided into the first back display area and the second back display area; the first back display area displays the preview image acquired by the rear camera; the composition reference information is displayed at the second back display area. Therefore, it is more convenient for the photographed person to determine the target composition information from the composition reference information according to the preview image, and the photographed person may be more satisfied with the photographed images.

In addition, in the embodiment of the present disclosure, it is also able to detect whether the current composition of the photographed object matches with the target composition information through the rear camera. If it is detected that the current composition of the photographed object matches with the target composition information, the rear camera is controlled to perform the photographing operation, therefore the photographing and the composition may be performed based on the target composition information, and the photographed person may be more satisfied with the photographed images.

Furthermore, in the embodiment of the present disclosure, the first display screen may be divided into the first front display area and the second front display area; the first front display area displays the preview image acquired by the rear camera; the composition reference information is displayed at the second front display area. Therefore, it is more convenient for the photographer to determine the target composition information from the composition reference information according to the preview image and direct the photographed person to perform a composition based on the target composition information, and the photographed person may be more satisfied with the photographed images.

In addition, in the embodiment of the present disclosure, a frame of the preview image acquired by the rear camera is acquired; a scene detection is performed on the preview image, to obtain current scene feature information; the composition reference information corresponding to the current scene feature information is determined, based on a correspondence between pre-stored scene feature information and the composition reference information; and the composition reference information corresponding to the current scene feature information is displayed on the second display screen; where the scene feature information includes at least one of a photographing scene type, a quantity of photographed subjects, ages of the photographed subjects, genders of the photographed subjects and historical composition information of the photographed subjects. Therefore, only the composition reference information corresponding to the current scene may be displayed on the second display screen, thereby effectively preventing the user from selecting target composition information that does not correspond to the current scene, and reducing the user operations.

Furthermore, in the embodiments of the present disclosure, the mobile terminal may also be controlled by voice instructions or gesture operations to switch composition reference images, determine target composition information, control the rear camera to perform the photographing operation, etc., thereby facilitating user operations.

The mobile terminal in this embodiment of the present disclosure is configured to implement the corresponding processing method hereinabove, and detail description thereof is omitted herein.

A mobile terminal is further provided in the embodiments of the present disclosure, including a processor, a memory and a computer program stored on the memory and executable on the processor, where the computer program is executed by the processor to perform the photographing method and the same technical effect may be achieved, the detailed description thereof is omitted herein.

A computer-readable storage medium is further provided in the embodiments of the present disclosure where a computer program is stored in the computer-readable storage medium, and the computer program is executed by a processor to perform the photographing method and the same technical effect may be achieved, the detailed description thereof is omitted herein. The computer-readable storage medium includes a read-only memory (ROM), a random access memory (RAM), a magnetic disk or an optical disk.

A mobile terminal in the embodiment of the present disclosure will be described in the following.

Figure 10:
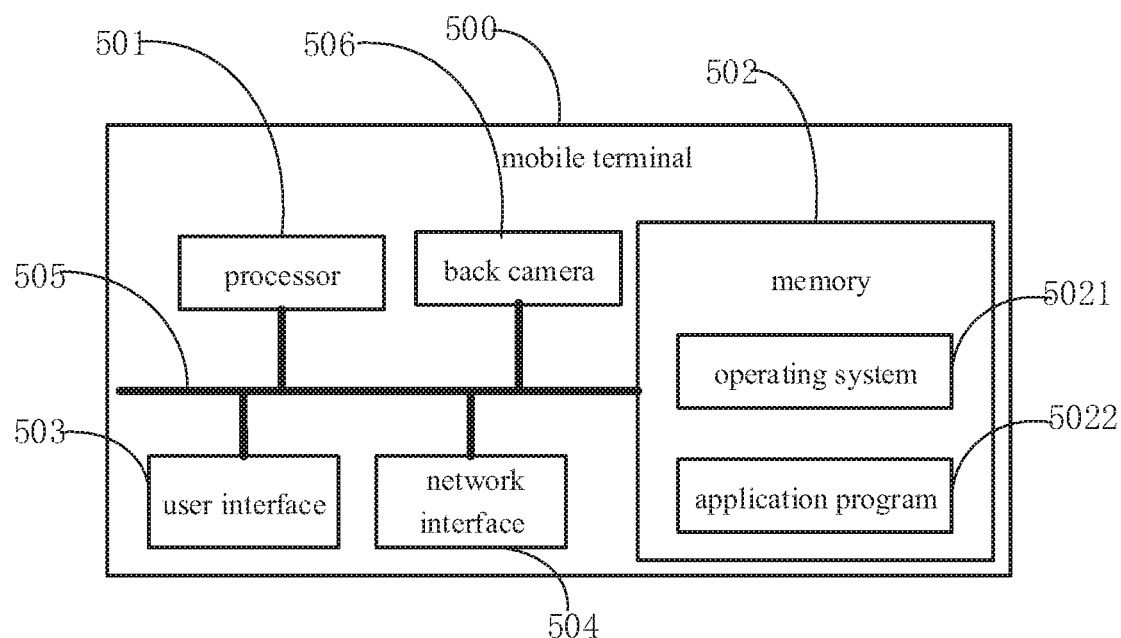
FIG. 10 is a third schematic view of a mobile terminal in the embodiments of the present disclosure.

FIG. 10 is a schematic view of a mobile terminal in the embodiments of the present disclosure.

The mobile terminal 500 shown in FIG. 10 includes at least one processor 501, a memory 502, at least one network interface 504, a user interface 503, and a rear camera 506. The various components in the mobile terminal 500 are coupled together via a bus system 505. It can be understood that the bus system 505 is configured to implement connection and communication between these components. The bus system 505 includes a data bus, a power bus, a control bus, and a status signal bus. However, for the sake of clarity, various buses are labeled as the bus system 505 in FIG. 10.

The user interface 503 may include a first display screen and a second display screen which are oppositely arranged, a keyboard, or a pointing device (for example, a mouse, a trackball, a touch panel, or a touch screen). The second display screen and the rear camera are arranged on the same side.

It can be understood that the memory 502 in the embodiment of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EROM), or erase programmable EPROM (EEPROM) or flash memory. The volatile memory may be a random access memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (Synchronous DRAM, SDRAM), double data rate synchronous dynamic random access memory (DDRSDRAM), enhanced synchronous dynamic random access memory (Enhanced SDRAM, ESDRAM), synchronous connection dynamic random access memory (Synchlink DRAM, SLDRAM), and direct memory bus random access memory (Direct Rambus RAM, DRRAM). The memory 502 of the systems and methods described in the embodiments of the present disclosure is intended to include, but is not limited to, these and any other suitable types of memory.

In some embodiments of the present disclosure, the memory 502 stores the following elements, executable modules or data structures, or a subset of them, or their extended set: an operating system 5021 and an application program 5022.

The operating system 5021 includes various system programs, such as a framework layer, a core library layer, and a driver layer, for implementing various basic services and processing hardware-based tasks. The application program 5022 includes various application programs, such as a media player and a browser, and is used to implement various application services. A program for implementing the method of the embodiment of the present disclosure may be included in an application program 5022.

In the embodiment of the present disclosure, the mobile terminal 500 further includes: a computer program stored on the memory 502 and executable on the processor 501. The computer program is executed by the processor 501 to perform: receiving a photographing function start instruction; displaying, on the first display screen and the second display screen respectively in a full screen display manner, a preview image acquired by the rear camera; displaying, on the second display screen, pre-stored composition reference information; determining target composition information in the composition reference information; and controlling the rear camera to perform a photographing operation, based on the target composition information.

The method disclosed in the foregoing embodiment of the present disclosure may be applied to the processor 501, or implemented by the processor 501. The processor 501 may be an integrated circuit chip and has a signal processing capability. In the implementation process, each step of the above method may be completed by an integrated logic circuit of hardware in the processor 501 or an instruction in the form of software. The processor 501 may be a general-purpose processor, a digital signal processor (DSP), an application specific integrated circuit (ASIC), a field programmable gate array (FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. The software module may be arranged in a mature computer-readable storage medium such as a random access memory, a flash memory, a read-only memory, a programmable read-only memory, or an electrically erasable programmable memory, a register, and the like in the art. The computer-readable storage medium is arranged in the memory 502, and the processor 501 reads the information in the memory 502 and completes the steps of the foregoing method in combination with its hardware. Specifically, a computer program is stored on the computer-readable storage medium, and the computer program is executed by the processor 501 to perform the foregoing photographing method.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASIC), digital signal processing (DSP), digital signal processing equipment (DSPD), and programmable logic device (PLD), field-programmable gate array (FPGA), general-purpose processor, controller, microcontroller, microprocessor, and other electronic units for performing the functions described in this application or a combination thereof.

For software implementation, the technology described in the embodiments of the present disclosure can be implemented by modules (such as procedures, functions, etc.) that perform the functions described in the embodiments of the present disclosure. Software codes may be stored in a memory and executed by a processor. The memory may be implemented in the processor or external to the processor.

Optionally, the computer program is executed by the processor 501 to:

display the composition reference information on the second display screen in a full screen display manner.

Optionally, the computer program is executed by the processor 501 to:

divide the second display screen into a first back display area and a second back display area; display, at the first back display area, the preview image acquired by the rear camera; and display the composition reference information at the second back display area.

Optionally, the computer program is executed by the processor 501 to: acquire a frame of the preview image acquired by the rear camera; perform a scene detection on the preview image, to obtain current scene feature information; determine the composition reference information corresponding to the current scene feature information, based on a correspondence between pre-stored scene feature information and the composition reference information; and display the composition reference information corresponding to the current scene feature information on the second display screen, where the scene feature information includes at least one of a photographing scene type, a quantity of photographed subjects, ages of the photographed subjects, genders of the photographed subjects and historical composition information of the photographed subjects.

Optionally, the composition reference information includes at least one composition reference image.

Optionally, the computer program is executed by the processor 501 to: display a preset composition reference image of the at least one composition reference image on the second display screen; or display, on the second display screen, a preset quantity of composition reference images of the at least one composition reference image, in an order from the composition reference image used most frequently to the composition reference image used least frequently.

Optionally, the computer program is executed by the processor 501 to: detect, through the rear camera, a gesture operation; acquire a first composition reference image currently displayed on the second display screen, in the case that the gesture operation is detected and the gesture operation is a first preset gesture; and switch the first composition reference image to a second composition reference image; determine the composition reference image currently displayed on the second display screen as the target composition information, in the case that the gesture operation is detected and the gesture operation is a second preset gesture; control the rear camera to perform the photographing operation, in the case that the gesture operation is detected and the gesture operation is a third preset gesture.

Optionally, the computer program is executed by the processor 501 to: turn on a microphone of the mobile terminal to detect a voice instruction; acquire a third composition reference image currently displayed on the second display screen, in the case that the voice instruction is detected and the voice instruction includes a preset first keyword; switch the third composition reference image to a fourth composition reference image; determine the composition reference image currently displayed on the second display screen as the target composition information, in the case that the voice instruction is detected and the voice instruction includes a preset second keyword; control the rear camera to perform the photographing operation, in the case that the voice instruction is detected and the voice instruction includes a preset third keyword.

Optionally, the computer program is executed by the processor 501 to: detect, through the rear camera, whether a current composition of a photographed object is matched with the target composition information; control the rear camera to perform the photographing operation, in the case that the current composition of the photographed object is matched with the target composition information.

The mobile terminal 500 can implement the processes implemented by the mobile terminal in the foregoing embodiments. To avoid repetition, details thereof are omitted herein.

Figure 11:
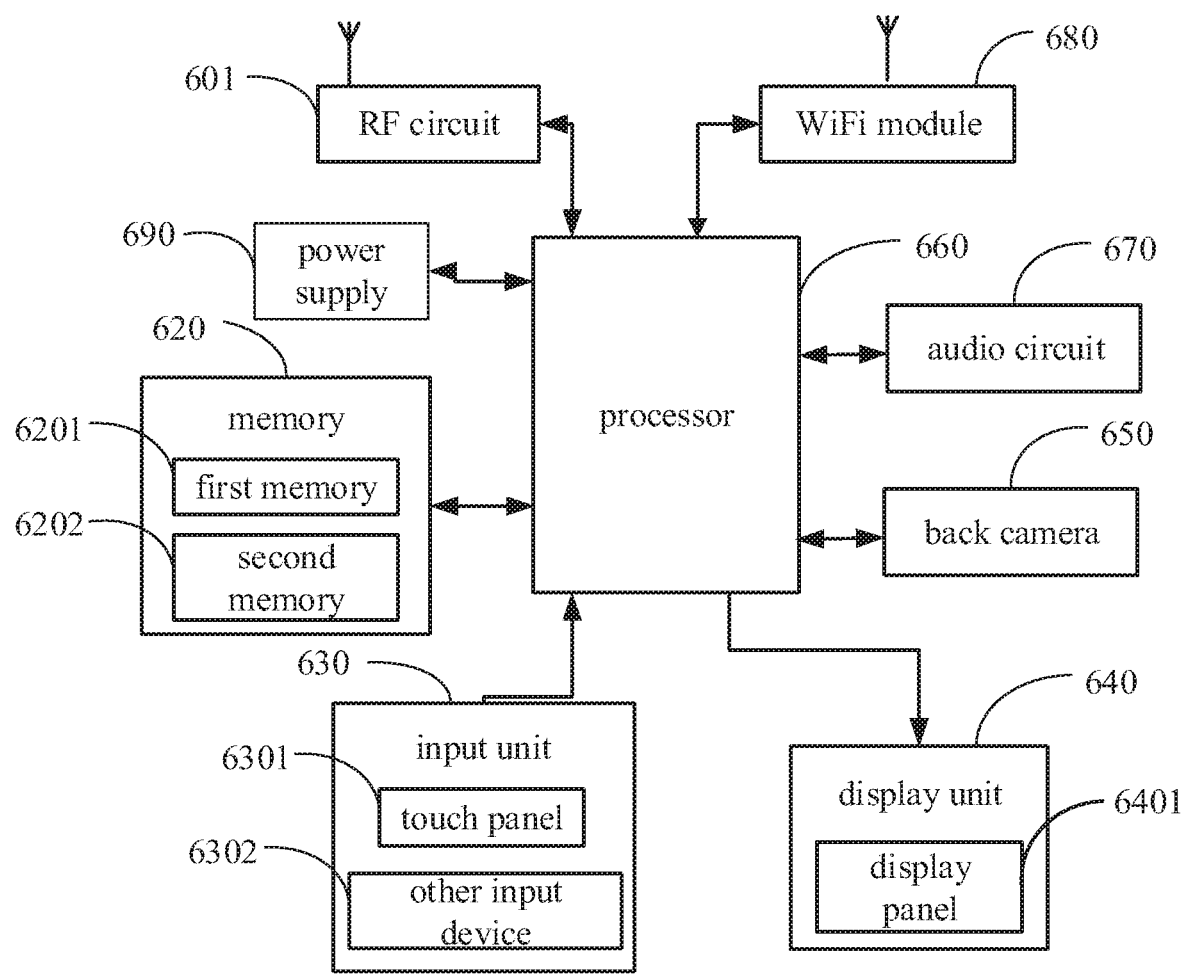
FIG. 11 is a fourth schematic view of a mobile terminal in the embodiments of the present disclosure.

FIG. 11 is a schematic view of a mobile terminal in the embodiments of the present disclosure. Specifically, the mobile terminal in FIG. 11 may be a mobile phone, a tablet computer, a personal digital assistant (PDA), or a vehicle-mounted computer.

The mobile terminal in FIG. 11 includes a radio frequency (RF) circuit 610, a memory 620, an input unit 630, a display unit 640, a rear camera 650, a processor 660, an audio circuit 670, a Wireless Fidelity (WiFi) module 680, and a power supply 690.

The input unit 630 may be configured to receive digital or character information input by a user, and generate signal inputs related to user settings and function control of the mobile terminal. Specifically, in the embodiment of the present disclosure, the input unit 630 may include a touch panel 631. The touch panel 631, also known as a touch screen, can collect user's touch operations on or near it (such as the operation of the user on the touch panel 631 using any suitable object or accessory such as a finger, a stylus pen), and according to the preset settings a specific program drives the corresponding connected device. Optionally, the touch panel 631 may include a touch detection device and a touch controller. Among them, the touch detection device detects the user's touch position, and detects the signal brought by the touch operation, and transmits the signal to the touch controller; the touch controller receives touch information from the touch detection device, converts it into contact coordinates, and sends contact coordinates to the processor 660, and can receive commands from the processor 660 and execute them. In addition, the touch panel 631 may be implemented in various types such as a resistive type, a capacitive type, an infrared type, and a surface acoustic wave. In addition to the touch panel 631, the input unit 630 may also include other input devices 632. The other input devices 632 may include, but are not limited to, one or more of a physical keyboard, function keys (such as volume control keys, switch keys, etc.), trackball, mouse, joystick, etc.

The display unit 640 may be configured to display information input by the user or information provided to the user and various menu interfaces of the mobile terminal. The display unit 640 may include a display panel 641. Optionally, the display panel 641 may be configured in the form of an LCD or an organic light-emitting diode (OLED). The display panel 641 may further include a first display screen and a second display screen arranged opposite to each other, and the second display screen is arranged at the same side as the rear camera.

It should be noted that the touch panel 631 may cover the display panel 641 to form a touch display screen. When the touch display screen detects a touch operation on or near the touch display screen 631, it is transmitted to the processor 660 to determine the type of the touch event. 660 provides corresponding visual output on the touch display according to the type of touch event.

The touch display includes an application program interface display area and common control component display area. The arrangement manners of the display area of the application program interface and the display area of the common control component are not limited, and may be an arrangement manner for distinguishing the two display areas, such as an up-down arrangement, a left-right arrangement, and the like. The application program interface display area can be used to display the interface of the application program. Each interface may include interface elements such as at least one application icon and/or widget desktop control. The application program interface display area can also be an empty interface without any content. This common control component display area is used to display control components often used, such as setting buttons, interface numbers, scroll bars, application icons such as phonebook icons, and so on.

The processor 660 is a control center of the mobile terminal, and uses various interfaces and lines to connect various parts of the entire mobile phone, and runs or executes software programs and/or modules stored in the first memory 621, and calls the data stored in the second memory 622 and performs various functions of the mobile terminal and processes the data, thereby performing overall monitoring of the mobile terminal. Optionally, the processor 660 may include one or more processing units.

In the embodiment of the present disclosure, the mobile terminal further includes: a computer program stored in the memory 620 and executable on the processor 660, and the computer program is executed by the processor 660 to perform: receiving a photographing function start instruction; displaying, on the first display screen and the second display screen respectively in a full screen display manner, a preview image acquired by the rear camera; displaying, on the second display screen, pre-stored composition reference information; determining target composition information in the composition reference information; and controlling the rear camera to perform a photographing operation, based on the target composition information.

Optionally, the computer program is executed by the processor 660 to: display the composition reference information on the second display screen in a full screen display manner.

Optionally, the computer program is executed by the processor 660 to: divide the second display screen into a first back display area and a second back display area; display, at the first back display area, the preview image acquired by the rear camera; and display the composition reference information at the second back display area.

Optionally, the computer program is executed by the processor 660 to: divide the first display screen into a first front display area and a second front display area; display, at the first front display area, the preview image acquired by the rear camera; and display the composition reference information at the second front display area.

Optionally, the computer program is executed by the processor 660 to: acquire a frame of the preview image acquired by the rear camera; perform a scene detection on the preview image, to obtain current scene feature information; determine the composition reference information corresponding to the current scene feature information, based on a correspondence between pre-stored scene feature information and the composition reference information; and display the composition reference information corresponding to the current scene feature information on the second display screen, where the scene feature information includes at least one of a photographing scene type, a quantity of photographed subjects, ages of the photographed subjects, genders of the photographed subjects and historical composition information of the photographed subjects.

Optionally, the composition reference information includes at least one composition reference image.

Optionally, the computer program is executed by the processor 660 to: display a preset composition reference image of the at least one composition reference image on the second display screen; or display, on the second display screen, a preset quantity of composition reference images of the at least one composition reference image, in an order from the composition reference image used most frequently to the composition reference image used least frequently.

Optionally, the computer program is executed by the processor 660 to: detect, through the rear camera, a gesture operation; acquire a first composition reference image currently displayed on the second display screen, in the case that the gesture operation is detected and the gesture operation is a first preset gesture; and switch the first composition reference image to a second composition reference image; determine the composition reference image currently displayed on the second display screen as the target composition information, in the case that the gesture operation is detected and the gesture operation is a second preset gesture; control the rear camera to perform the photographing operation, in the case that the gesture operation is detected and the gesture operation is a third preset gesture.

Optionally, the computer program is executed by the processor 660 to: turn on a microphone of the mobile terminal to detect a voice instruction; acquire a third composition reference image currently displayed on the second display screen, in the case that the voice instruction is detected and the voice instruction includes a preset first keyword; switch the third composition reference image to a fourth composition reference image; determine the composition reference image currently displayed on the second display screen as the target composition information, in the case that the voice instruction is detected and the voice instruction includes a preset second keyword; control the rear camera to perform the photographing operation, in the case that the voice instruction is detected and the voice instruction includes a preset third keyword.

Optionally, the computer program is executed by the processor 660 to: detect, through the rear camera, whether a current composition of a photographed object is matched with the target composition information; control the rear camera to perform the photographing operation, in the case that the current composition of the photographed object is matched with the target composition information.

According to the embodiments of the present disclosure, a photographing function start instruction is received, a preview image acquired by the rear camera is displayed on the first display screen and the second display screen respectively in a full screen display manner, pre-stored composition reference information is displayed on the second display screen, target composition information in the composition reference information is determined, and the rear camera is controlled to perform a photographing operation, based on the target composition information. The photographed person may see the photographing preview interface and the composition reference information through the back display screen. The photographed person may select the required composition information, so as to obtain an image which the photographed person is satisfied with.

Furthermore, in the embodiment of the present disclosure, the second display screen may be divided into the first back display area and the second back display area; the first back display area displays the preview image acquired by the rear camera; the composition reference information is displayed at the second back display area. Therefore, it is more convenient for the photographed person to determine the target composition information from the composition reference information according to the preview image, and the photographed person may be more satisfied with the photographed images.

In addition, in the embodiment of the present disclosure, it is also able to detect whether the current composition of the photographed object matches with the target composition information through the rear camera. If it is detected that the current composition of the photographed object matches with the target composition information, the rear camera is controlled to perform the photographing operation, therefore the photographing and the composition may be performed based on the target composition information, and the photographed person may be more satisfied with the photographed images.

Furthermore, in the embodiment of the present disclosure, the first display screen may be divided into the first front display area and the second front display area; the first front display area displays the preview image acquired by the rear camera; the composition reference information is displayed at the second front display area. Therefore, it is more convenient for the photographer to determine the target composition information from the composition reference information according to the preview image and direct the photographed person to perform a composition based on the target composition information, and the photographed person may be more satisfied with the photographed images.

In addition, in the embodiment of the present disclosure, a frame of the preview image acquired by the rear camera is acquired; a scene detection is performed on the preview image, to obtain current scene feature information; the composition reference information corresponding to the current scene feature information is determined, based on a correspondence between pre-stored scene feature information and the composition reference information; and the composition reference information corresponding to the current scene feature information is displayed on the second display screen; where the scene feature information includes at least one of a photographing scene type, a quantity of photographed subjects, ages of the photographed subjects, genders of the photographed subjects and historical composition information of the photographed subjects. Therefore, only the composition reference information corresponding to the current scene may be displayed on the second display screen, thereby effectively preventing the user from selecting target composition information that does not correspond to the current scene, and reducing the user operations.

Furthermore, in the embodiments of the present disclosure, the mobile terminal may also be controlled by voice instructions or gesture operations to switch composition reference images, determine target composition information, control the rear camera to perform the photographing operation, etc., thereby facilitating user operations.

A mobile terminal is further provided in the embodiments of the present disclosure, including a processor, a memory and a computer program stored on the memory and executable on the processor, where the computer program is executed by the processor to perform the photographing method hereinabove.

A computer-readable storage medium is further provided in the embodiments of the present disclosure where a computer program is stored in the computer-readable storage medium, and the computer program is executed by a processor to perform the photographing method hereinabove.

Those of ordinary skill in the art may realize that the units and algorithm steps of each example described in combination with the embodiments disclosed in the embodiments of the present disclosure can be implemented by electronic hardware, or a combination of computer software and electronic hardware. Whether these functions are performed in hardware or software depends on the specific application and design constraints of the technical solution. A person skilled in the art can use different methods to implement the described functions for each specific application, but such implementation should not be considered to be beyond the scope of the present disclosure.

Those skilled in the art can clearly understand that, for the convenience and brevity of description, the specific working processes of the systems, devices, and units described above can refer to the corresponding processes in the foregoing method embodiments, and are not repeated here.

In the embodiments provided in this application, it should be understood that the disclosed apparatus and method may be implemented in other ways. For example, the device embodiments described above are only schematic. For example, the division of the unit is only a logical function division. In actual implementation, there may be another division manner. For example, multiple units or components may be combined or can be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be arranged in one place, or may be distributed on multiple network units. Some or all of the units may be selected according to actual needs to achieve the objective of the solution of this embodiment.

In addition, each functional unit in each embodiment of the present disclosure may be integrated into one processing unit, or each unit may exist separately and physically, or two or more units may be integrated into one unit.

When the functions are implemented in the form of software functional units and sold or used as independent products, they can be stored in a computer-readable storage medium. Based on this understanding, the technical solution of the present disclosure is essentially a part that contributes to the existing technology or a part of the technical solution can be embodied in the form of a software product. The computer software product is stored in a storage medium, including several instructions are used to cause a computer device (which may be a personal computer, a server, or a network device, etc.) to perform all or part of the steps of the method described in various embodiments of the present disclosure. The foregoing storage medium includes various media that can store program codes, such as a U disk, a mobile hard disk, a ROM, a RAM, a magnetic disk, or an optical disk.

The above are only some embodiments of the present disclosure, and it should be noted that those skilled in the art may also make several improvements and refinements without departing from the principles of the present disclosure, which should also be considered as the scope of the present disclosure. Therefore, the scope of the present disclosure should be determined by the scope of the claims.

What is claimed is:

1. A photography method, applied to a mobile terminal, wherein the mobile terminal comprises a rear camera, a first display screen and a second display screen oppositely arranged, and the rear camera and the second display screen are arranged at the same side, and the method comprises:
   receiving a photographing function start instruction;
   displaying, on the first display screen and the second display screen respectively in a full screen display manner, a preview image acquired by the rear camera;
   displaying, on the second display screen, pre-stored composition reference information in a full screen display manner, or displaying, on the second display screen, pre-stored composition reference information and the preview image in a screen dividing manner;
   determining target composition information in the composition reference information; and
   controlling the rear camera to perform a photographing operation, based on the target composition information.

2. The method according to claim 1, wherein when the pre-stored composition reference information is displayed on the second display screen in a full screen display manner, the composition reference information covers the preview image.

3. The method according to claim 1, wherein the displaying on the second display screen the pre-stored composition reference information and the preview image in a screen dividing manner comprises:
   dividing the second display screen into a first back display area and a second back display area;
   displaying, at the first back display area, the preview image acquired by the rear camera; and
   displaying the composition reference information at the second back display area.

4. The method according to claim 1, wherein subsequent to the displaying on the second display screen the pre-stored composition reference information in a full screen display manner or displaying on the second display screen the pre-stored composition reference information and the preview image in a screen dividing manner and prior to the determining the target composition information in the composition reference information, the method further comprises:
   dividing the first display screen into a first front display area and a second front display area;
   displaying, at the first front display area, the preview image acquired by the rear camera; and
   displaying the composition reference information at the second front display area.

5. The method according to claim 1, wherein the displaying on the second display screen the pre-stored composition reference information in a full screen display manner or displaying on the second display screen the pre-stored composition reference information and the preview image in a screen dividing manner comprises:

acquiring a frame of the preview image acquired by the rear camera;

performing a scene detection on the preview image, to obtain current scene feature information;

determining the composition reference information corresponding to the current scene feature information, based on a correspondence between pre-stored scene feature information and the composition referece information; and displaying the composition reference information corresponding to the current scene feature information on the second display screen;

wherein the scene feature information comprises at least one of a photographing scene type, a quantity of photographed subjects, ages of the photographed subjects, genders of the photographed subjects and historical composition information of the photographed subjects.

6. The method according to claim 5, wherein the composition reference information comprises at least one composition reference image, the displaying the composition reference information corresponding to the current scene feature information on the second display screen comprises:

displaying a preset composition reference image of the at least one composition reference image on the second display screen; or displaying, on the second display screen, a preset quantity of composition reference images of the at least one composition reference image, in an order from the composition reference image used most frequently to the composition reference image used least frequently.

7. The method according to claim 6, wherein subsequent to the displaying on the second display screen the pre-stored composition reference information and prior to the determining the target composition information in the composition reference information, the method comprises:

detecting, through the rear camera, a gesture operation;

acquiring a first composition reference image currently displayed on the second display screen, in the case that the gesture operation is detected and the gesture operation is a first preset gesture; and switching the first composition reference image to a second composition reference image;

the determining the target composition information in the composition reference information comprises:

determining the composition reference image currently displayed on the second display screen as the target composition information, in the case that the gesture operation is detected and the gesture operation is a second preset gesture;

the controlling the rear camera to perform the photographing operation based on the target composition information comprises:

controlling the rear camera to perform the photographing operation, in the case that the gesture operation is detected and the gesture operation is a third preset gesture.

8. The method according to claim 6, wherein subsequent to the displaying on the second display screen the pre-stored composition reference information and prior to the determining the target composition information in the composition reference information, the method further comprises:

turning on a microphone of the mobile terminal to detect a voice instruction;

acquiring a third composition reference image currently displayed on the second display screen, in the case that the voice instruction is detected and the voice instruction comprises a preset first keyword;

switching the third composition reference image to a fourth composition reference image;

the determining the target composition information in the composition reference information comprises:

determining the composition reference image currently displayed on the second display screen as the target composition information, in the case that the voice instruction is detected and the voice instruction comprises a preset second keyword;

the controlling the rear camera to perform the photographing operation based on the target composition information comprises:

controlling the rear camera to perform the photographing operation, in the case that the voice instruction is detected and the voice instruction comprises a preset third keyword.

9. The method according to claim 1, wherein the controlling the rear camera to perform the photographing operation based on the target composition information comprises:

detecting, through the rear camera, whether a current composition of a photographed object is matched with the target composition information;

controlling the rear camera to perform the photographing operation, in the case that the current composition of the photographed object is matched with the target composition information.

10. A mobile terminal, comprising: a rear camera, a first display screen and a second display screen oppositely arranged, wherein the rear camera and the second display screen are arranged at the same side, and the mobile terminal further comprises; a memory, a processor and a computer program stored in the memory and executable by the processor, wherein the computer program is executed by the processor to:

receive a photographing function start instruction;

display, on the first display screen and the second display screen respectively in a full screen display manner, a preview image acquired by the rear camera;

display, on the second display screen, pre-stored composition reference information in a full screen display manner, or display, on the second display screen, pre-stored composition reference information and the preview image in a screen dividing manner;

determine target composition information in the composition reference information; and perform a photographing operation, based on the target composition information.

11. The mobile terminal according to claim 10, wherein the computer program is executed by the processor to display the pre-stored composition reference information on the second display screen in a full screen display manner, the composition reference information covers the preview image.

12. The mobile terminal according to claim 10, wherein the computer program is executed by the processor to display the pre-stored composition reference information and the preview image on the second display screen in a screen dividing manner, the computer program is executed by the processor further to:

divide the second display screen into a first back display srea and a second back display area;

display, at the first back display area, the preview image acquired by the rear camera; and display the composition reference information at the second back display area.

13. The mobile terminal according to claims 10, wherein the computer program is executed by the processor to:
- divide the first display screen into a first front display area and a second front display area;
- display, at the first front display area, the preview image acquired by the rear camera; and
- display the composition reference information at the second front display area.

14. The mobile terminal according to claims 10, wherein the computer program is executed by the processor to:
- acquire a frame of the preview image acquired by the rear camera;
- perform a scene detection on the preview image, to obtain current scene feature information;
- determine the composition reference information corresponding to the current scene feature information, based on a correspondence between pre-stored scene feature information and the composition reference information; and
- display the composition reference information corresponding to the current scene feature information on the second display screen;
- wherein the scene feature information comprises at least one of a photographing scene type, a quantity of photographed subjects, ages of the photographed subjects, genders of the photographed subjects and historical composition information of the photographed subjects.

15. The mobile terminal according to claim 14, wherein the composition reference information comprises at least one composition reference image; the computer program is executed by the processor to:
- display a preset composition reference image of the at least one composition reference image on the second display screen; or
- display, on the second display screen, a preset quantity of composition reference images of the at least one composition reference image, in an order from the composition reference image used most frequently to the composition reference image used least frequently.

16. The mobile terminal according to claim 15, wherein the computer program is executed by the processor to:
- detect, through the rear camera, a gesture operation;
- acquire a first composition reference image currently displayed on the second display screen, in the case that the gesture operation is detected and the gesture operation is a first preset gesture; and
- switch the first composition reference image to a second composition reference image;
- determine the composition reference image currently displayed on the second display screen as the target composition information, in the case that the gesture operation is detected and the gesture operation is a second preset gesture;
- control the rear camera to perform the photographing operation, in the case that the gesture operation is detected and the gesture operation is a third preset gesture.

17. The mobile terminal according to claim 15, wherein the computer program is executed by the processor to;
- turn on a microphone of the mobile terminal to detect a voice instruction;
- acquire a third composition reference image currently displayed on the second display screen, in the case that the voice instruction is detected and the voice instruction comprises a preset first keyword;
- switch the third composition reference image to a fourth composition reference image;
- determine the composition reference image currently displayed on the second display screen as the target composition information, in the case that the voice instruction is detected and the voice instruction comprises a preset second keyword;
- control the rear camera to perform the photographing operation, in the case that the voice instruction is detected and the voice instruction comprises a preset third keyword.

18. The mobile terminal according to claim 10, wherein the computer program is executed by the processor to:
- detect, through the rear camera, whether a current composition of a photographed object is matched with the target composition information;
- control the rear camera to perform the photographing operation, in the case that the current composition of the photographed object is matched with the target composition information.

* * * * *